(12) United States Patent
Sakashita et al.

(10) Patent No.: US 10,592,112 B2
(45) Date of Patent: Mar. 17, 2020

(54) STORAGE SYSTEM SOFTWARE UPGRADE AND DATA MIGRATION

(71) Applicant: Hitachi, Ltd., Tokyo (JP)

(72) Inventors: Yuki Sakashita, Santa Clara, CA (US); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/030,903

(22) Filed: Jul. 10, 2018

(65) Prior Publication Data

US 2020/0019318 A1    Jan. 16, 2020

(51) Int. Cl.
*G06F 11/14*    (2006.01)
*G06F 3/06*    (2006.01)

(52) U.S. Cl.
CPC .......... *G06F 3/0607* (2013.01); *G06F 3/0647* (2013.01); *G06F 3/0665* (2013.01); *G06F 3/0673* (2013.01)

(58) Field of Classification Search
CPC .............................. G06F 3/0607; G06F 3/0673
USPC ....................................................... 711/161
See application file for complete search history.

(56) References Cited

U.S. PATENT DOCUMENTS

| | | | |
|---|---|---|---|
| 6,721,841 B2 | 4/2004 | Fukuzawa et al. | |
| 2002/0156977 A1* | 10/2002 | Derrick | G06F 9/30174 711/118 |
| 2005/0225558 A1* | 10/2005 | Morein | G06F 3/14 345/557 |

* cited by examiner

*Primary Examiner* — Jae U Yu
(74) *Attorney, Agent, or Firm* — Mattingly & Malur, PC

(57) ABSTRACT

In some examples, a system may include a computing device in communication with at least one storage device. Initially, the computing device may execute a first type of storage software which stores a first volume in a first storage format on the storage device. The computing device may thereafter execute a second type of storage software which configures a second volume in a second storage format on the storage device. Subsequently, the data of the first volume is migrated to the second volume where the data is stored in the second storage format. In some cases, the second storage software may further define a virtual external device on the storage device and define a logical path from the virtual external device to the first volume. The logical path may be used to migrate the data from the first volume to the second volume.

17 Claims, 28 Drawing Sheets

401

| VOLUME ID | LUN | NODE ID | SIZE [TB] |
|---|---|---|---|
| 000 | 000 | 000 | 10 |
| 001 | 001 | 000 | 10 |
| 002 | 002 | 001 | 20 |
| 003 | 003 | 001 | 20 |
| 004 | 004 | 002 | 30 |
| 005 | 005 | 003 | 40 |

| VOLUME ID | VOLUME TYPE | VIRTUAL/EXTERNAL/DATA VOLUME ID | LUN |
|---|---|---|---|
| 000 | VIRTUAL | 000 | 000 |
| 001 | EXTERNAL | 000 | - |
| 002 | DATA | 000 | - |
| 003 | VIRTUAL | 001 | 001 |
| 004 | EXTERNAL | 001 | - |
| 005 | DATA | 001 | - |
| 006 | VIRTUAL | 002 | 002 |
| 007 | EXTERNAL | 002 | - |
| 008 | DATA | 002 | - |
| 009 | VIRTUAL | 003 | 003 |
| 010 | EXTERNAL | 003 | - |
| 011 | DATA | 003 | - |
| 012 | VIRTUAL | 004 | 004 |
| 013 | EXTERNAL | 004 | - |
| 014 | DATA | 004 | - |
| 015 | DATA | 005 | 005 |
| 016 | DATA | 006 | - |
| 017 | VIRTUAL | 005 | - |
| 018 | EXTERNAL | 005 | 006 |
| 019 | DATA | 007 | - |
| 020 | DATA | 007 | - |

FIG. 7

| NODE ID | TOTAL [TB] | USED [TB] | FREE [TB] |
|---|---|---|---|
| 000 | 40 | 20 | 20 |
| 001 | 40 | 40 | 0 |
| 002 | 40 | 30 | 10 |
| 003 | 40 | 40 | 0 |

| EXTERNAL VOLUME ID | SIZE [TB] | EXTERNAL STORAGE NAME | WAN IP ADDRESS | LUN |
|---|---|---|---|---|
| 000 | 010 | TRADITIONAL STORAGE | 10.20.30.1 | 000 |
| 001 | 010 | TRADITIONAL STORAGE | 10.20.30.1 | 001 |
| 002 | 020 | TRADITIONAL STORAGE | 10.20.30.1 | 002 |
| 003 | 020 | TRADITIONAL STORAGE | 10.20.30.1 | 003 |
| 004 | 030 | TRADITIONAL STORAGE | 10.20.30.1 | 004 |
| 005 | 040 | TRADITIONAL STORAGE | 10.20.30.1 | 005 |

STORAGE SYSTEM SOFTWARE UPGRADE AND DATA MIGRATION

BACKGROUND

In situations where a format used by newly installed storage software differs from a format used by previously installed storage software, migration operation may be performed on data managed by the previously installed storage software while also converting the data to the format of the newly installed storage software. When a free space available in a first location in the storage system is less than a size of the data in the format used by previously installed storage software, a problem exists that the data cannot be copied to the format used by the newly installed storage software and stored at the first location. Furthermore, users may want access to their objects without having to wait for their objects to be migrated to the format used by the newly installed storage software. Accordingly, it may be desirable to manage the migration operation to make the data which is to be migrated available during the migration operation.

SUMMARY

Some implementations include a first computing device in communication with at least one storage device. Initially, the first computing device may execute a first type of storage software that stores a first volume in a first storage format on the storage device. The first computing device may thereafter execute a second type of storage software that configures a second volume in a second storage format on the storage device. Subsequently, the data of the first volume may be migrated to the second volume where the data is stored in the second storage format different from the first storage format. In some cases, the second type of storage software may further define a virtual external device on the storage device and define a logical path from the virtual external device to the first volume. The data may be migrated using the logical path to migrate the data from the first volume to the second volume.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates a detailed volume table for traditional storage software according to some implementations.

FIG. 7 illustrates a detailed volume table for functional storage software according to some implementations.

FIG. 8 illustrates a detailed computing device capacity table for functional storage software according to some implementations.

FIG. 10 illustrates a detailed virtual external device forwarding table for functional storage software according to some implementations.

DETAILED DESCRIPTION

Figure 1:
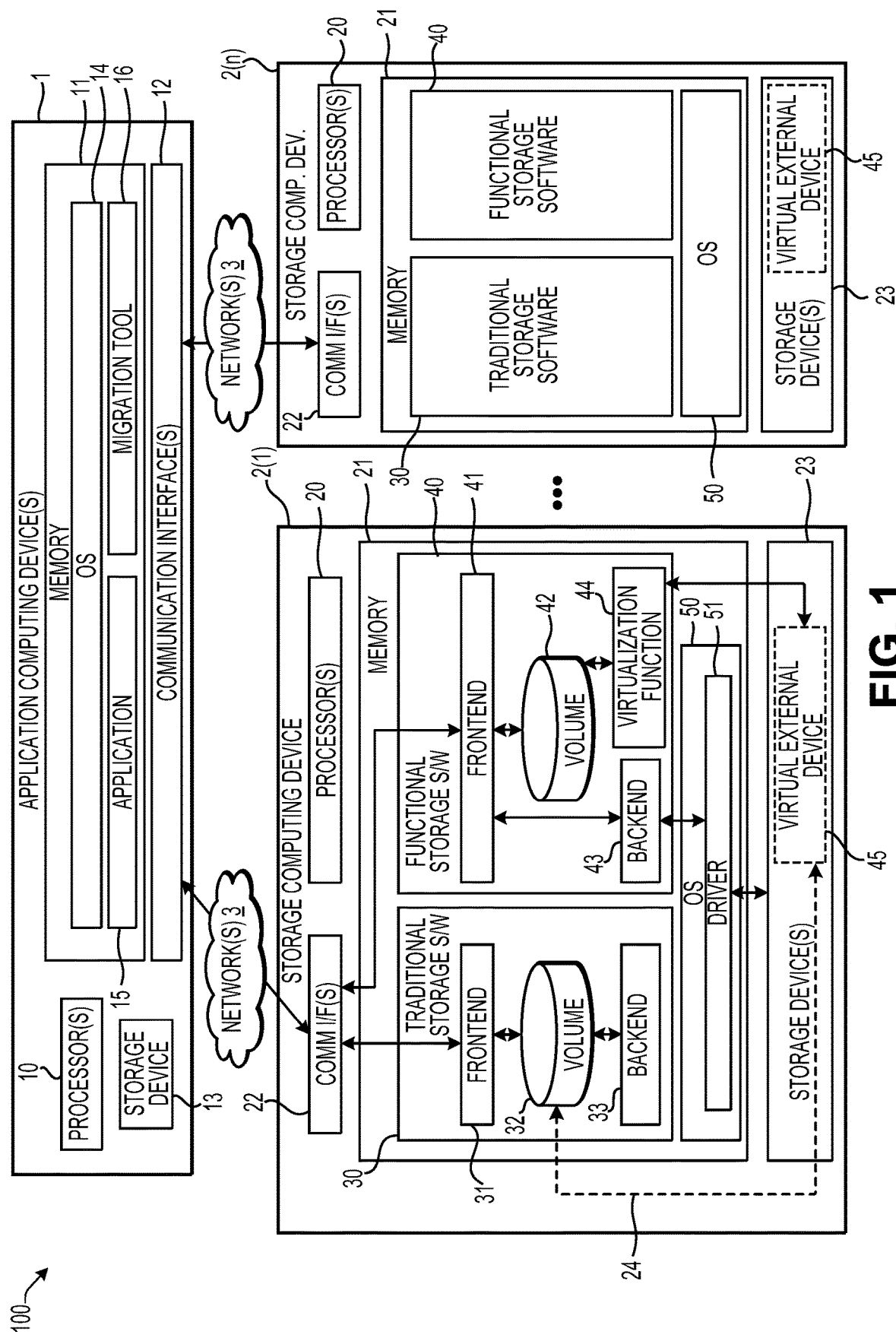
FIG. 1 illustrates an example architecture of a system configured to migrate a data volume according to some implementations.

Some implementations include techniques and arrangements for enabling an original data volume in a first storage format corresponding to a previously installed first storage software to be migrated to a new volume in a second storage format. For example, the second storage format may correspond to a newly installed second storage software, and the new volume may be based on a size of the original data volume in the first storage format and an amount of available storage space for the new volume in the second storage format. In some instances, the original data volume in the first storage format may be migrated to the new volume in the second storage format within a same storage computing device.

In other instances, the original data volume in the first storage format may be migrated from a first storage computing device to the new volume in the second storage format in a second storage computing device different from the first storage computing device. In still other instances, the original data volume in the first storage format may be migrated from the first storage computing device to plural new volumes within a same storage computing device. In yet other instances, the original data volume in the first storage format may be migrated from the first storage computing device to plural new volumes in the second storage format, which are provided at the first storage computing device and one or more second storage computing devices. The migration destination may be determined based on the available storage of the first storage computing device serving as the storage location of the original data volume and further determined based on the available storage of the second storage computing devices.

Some examples herein include facilitating migration of a group of data objects, such as a group of files, which, prior to deploying second storage software, are stored within a first volume managed by first storage software. For instance, the group of files may correspond to a file system, folder, directory, namespace, or the like. The files may be accessed by an application executing on a higher-level device. As one example, if a new version of a file is received, the system may check whether migration is occurring prior to determining how to update the file with the new version. The first storage software is generally referred to herein as "traditional storage software" and the second storage software is generally referred to herein as "functional storage software". Volume(s) of data associated with a storage format specific to the traditional storage software are generally referred to herein as "traditional" volumes. Volume(s) of data associated with a storage format specific to the functional storage software are generally referred to herein as "functional" volumes. Unless otherwise specified, any volume discussed herein may be provided as a physical volume, a logical volume or a virtual volume. In the following description, the volumes are assumed to be virtual volumes provided using virtualization techniques which are known to those of ordinary skill in the art.

Implementations herein may generate a number of new functional volumes managed by the functional storage software to facilitate migration of the traditional volumes. Accordingly, computing and storage resources are conserved such that (a) functional volumes are located to optimize free space at the location of the traditional volume, and (b) access to files is maintained while migration is ongoing. Furthermore, while this description may use the term "file" instead of "object" for clarity in some examples, the description herein applies to other types of objects and data sets as well, and not just to files.

As one example, prior to deploying functional storage software at a storage computing device, the storage computing device executes traditional storage software which manages files stored as data in a traditional volume. Once the functional storage software is deployed at the storage computing device, a migration tool may instruct the functional storage software to schedule migration of the traditional volume. Once migration of the traditional volume is scheduled, the functional storage software virtualizes the traditional volume and migrates the traditional volume to one or more functional volumes.

When a size of the traditional volume is not greater than a free space of the storage computing device, the traditional volume is migrated to a functional volume at the same storage computing device. When a size of the traditional volume is greater than a free space of the storage computing device and when the free space of the same storage computing device is greater than a predetermined threshold value, the traditional volume is migrated to a plurality of functional volumes at the same storage computing device in a sequential manner.

When a size of the traditional volume is greater than a free space of the storage computing device and when the free space of the same storage computing device is not greater than the predetermined threshold value, another storage computing device become potential migration destinations for a part of the traditional volume. When the size of the traditional volume is not greater than a free space of the other storage computing device, the traditional volume is migrated to a functional volume at the other storage computing device. When the size of the traditional volume is greater than the free space of the other storage computing device and when the free space of the other storage computing device is greater than the predetermined threshold value, at least one part of the traditional volume is migrated to a functional volume of the other storage computing device and then a remainder of the traditional volume is migrated to a functional volume of the same computing device which stores the traditional volume.

In some implementations, the functional storage software creates a virtual external device to manage input and output access to the traditional volume during the migration. In some implementations, input and output access to migrate the data of the traditional volume may be performed through a path corresponding to the virtual external device. In some implementations, input and output access to the data of the traditional volume from a higher level device, such as an application computing device, may be performed through the path via virtual external device. In some other implementations, after migration of the traditional volume to the functional volume(s) is completed, the traditional volume is deleted in order to create free space at the storage computing device which stored the traditional volume. In still other implementations, after migration of the traditional volume to the functional volume(s) is completed, the virtual external device is deleted.

For discussion purposes, some example implementations are described in the environment of computing system having one or more application computing devices in communication with one or more storage computing devices. However, implementations herein are not limited to the particular examples provided, and may be extended to other types of computing systems, other types of storage environments, other system architectures, and so forth, as will be apparent to those of skill in the art in light of the disclosure herein.

FIG. 1 illustrates an example architecture of a system 100 configured to store a traditional volume 32 and migrate the traditional volume 32 to a functional volume 42 according to some implementations. The system 100 includes a least one application computing device 1, that is configured to communicate with, or is otherwise coupled to, one or more storage computing devices 2, such as through one or more networks 3. Although not shown, the application computing device 1 may also be configured to communicate over one or more networks 3 with one or more user devices or other types of client devices.

In some examples, the application computing device 1 may include one or more servers or other types of computing devices that may be embodied in any number of ways. For instance, in the case of a server, the programs, modules, other functional components, and at least a portion of data storage may be implemented on at least one server, such as in a cluster of servers, a server farm or data center, a cloud-hosted computing service, and so forth, although other computer architectures may additionally or alternatively be used. In the illustrated example, the application computing device 1 includes, or may have associated therewith, at least one processor 10, at least one memory 11 storing an operating system (OS) 14, at least one application 15, a migration tool 16, at least one storage device 13, and at least one communication interface (I/F) 12 which may be configured as at least one network port coupled to the one or more networks 3.

As shown in FIG. 1, a plurality of 'n' storage computing devices 2(1), . . . , 2(n) are mutually coupled by the network(s) 3. In some examples, each storage computing device 2 may include one or more servers or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used. In the illustrated example, the storage computing device 2 includes, or may have associated therewith, at least one processor 20, at least one memory 21 storing traditional storage software (S/W) 30, functional storage software (S/W) 40, and an operating system (OS) 50, at least one storage device 23, and at least one communication interface configured by at least one network port 22 coupled to the network(s) 3 to communicate with the application computing device 1 and other storage computing devices 2. In some examples, the OS 50 may run directly on the one or more processors 20. In other examples, a hypervisor (not shown in FIG. 1) may be employed to execute the OS 50 and the processors 20 may be implemented as one or more virtual machines. In addition, in some cases, the functional storage S/W 40 may be run as a container and data objects may be stored in the storage based on the container class characteristics.

Each processor 10, 20 may be a single processing unit or a number of processing units, and may include single or multiple computing units or multiple processing cores. The processor 10, 20 can be implemented as one or more central processing units, microprocessors, microcomputers, microcontrollers, digital signal processors, state machines, logic circuitries, and/or any devices that manipulate signals based on operational instructions. For instance, the processor(s) 10, 20 may be one or more hardware processors and/or logic circuits of any suitable type specifically programmed or configured to execute the algorithms and processes described herein. The processor(s) 10, 20 can be configured to fetch and execute computer-readable instructions stored in the memory 11, 21, which can program the respective processor(s) 10, 20 to perform the functions described herein.

The storage device(s) 23, as well as the memory 11 and the memory 21 are examples of computer-readable media that may be used according some implementations herein. The computer-readable media may include volatile and nonvolatile memory and/or removable and non-removable media implemented in any type of technology for storage of information, such as computer-readable instructions, data structures, program modules, or other data. For example, the storage device(s) 23, memory 11, and memory 21 may be configured from computer-readable media including, but not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device.

Depending on the configuration, the computer-readable media may be a tangible non-transitory medium to the extent that, when mentioned, non-transitory computer-readable media exclude media such as energy, carrier signals, electromagnetic waves, and/or signals per se. In some cases, the storage device(s) 23 and other computer-readable media may be at the same location as the processor(s) 20, while in other examples, the storage device(s) 23 and/or other computer-readable media may be remote or partially remote from the processor(s) 20 such as in the case of network storage or a virtual storage device.

Communication amongst the application computing device(s) 1 and the storage computing device(s) 2 may be enabled via the communication interfaces 12, 22 communicating through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The one or more networks 3 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 3 may include both wired and/or wireless communication technologies. Components used for such communications can depend at least in part upon the type of network, the environment selected, or both. Protocols for communicating over such networks are well known and will not be discussed herein in detail. Accordingly, the application computing device(s) 1 and the storage computing device(s) 2 are able to communicate over the one or more networks 3 using wired or wireless connections, and combinations thereof.

The storage device 23 provides the addressable storage space which is managed by the traditional storage software 30 to provide a traditional volume 32 storing data according to a first storage format. The storage device 23 also provides the addressable storage space which is managed by the functional storage software 40 to provide a functional volume 42 storing data according to a second storage format different from the first storage format. In many implementations, the traditional storage software 30 and the functional storage software 40 are functional components which comprise instructions or programs that are executable by the respective processor(s) 20 and that, when executed, specifically program the processor(s) 20 to perform the actions attributed herein to the storage computing device(s) 2. Functional components of the traditional storage software 30 and the functional storage software 40 include respective frontends 31, 41, which communicate with the network port 22, and respective backends 33, 43, which communicate with a driver 51 to interface with the storage device(s) 23, each of which may include one or more computer programs, applications, executable code, or portions thereof. For example, the traditional storage software 30 and the functional storage software 40 may provide communication functionality via the frontend 31 with the application 15 executed on the application computing device 1 and with the storage device(s) 23 via the backend 33.

The functional storage software 40 may further include a virtualization function 44 that programs the processor(s) 20 to configure a virtual external device 45 on the storage device 23. The details of the virtualization function and the virtual external device 45 will be explained additionally below. The operating system 50 may control and manage various other functions of the storage computing device 2. Likewise, the operating system 14 may control and manage various other functions of the application computing device 1. In some cases, the functional components may be stored in the storage device(s) 23, loaded into the memory 21, and executed by the processor(s) 20.

In some implementations, the application 15 accesses data stored in a file system managed by the OS 14. The data of the file system is initially stored in the volume 32 in a first storage format used by the traditional storage software 21. Sometime thereafter, the functional storage software 40 is deployed in the memory 21. In order to transition to the functional storage software 40 for managing storage of the data, the data in the first storage format stored in the traditional volume 32 may be converted into a second storage format used by the functional storage software 40. The first storage format may correspond to a file format in which data is encoded for storage in the traditional volume 32. The second storage format may correspond to another file format in which data is encoded for storage in the functional volume 42.

As one example the first storage format may be based on a traditional storage format in which the data is distributed into a plurality of drives within a single storage node, such as in the case of a RAID (redundant array of independent discs) configuration or other storage array. On the other hand, the second storage format may be a functional storage type of storage format that distributes data into a plurality of drives distributed across a plurality of storage nodes, such as in the case of erasure coding, and/or may employ a data integrity field in some examples. The functional storage software may not be able to access data stored using the traditional storage format because the functional storage software may not be able to determine how the data is distributed by the traditional storage and vice versa.

In some implementations, respective encoding of data may be one or more of proprietary formats, open-source formats, a combination thereof or other storage standards. Accordingly, it is necessary to convert and migrate the data in the first storage format of the traditional volume to a functional volume in the second storage format. For example, after deploying the functional storage software 40, the migration tool 16 may instruct the functional storage software 40 to initiate migration of the traditional volume 32 to a functional volume 42.

Prior to deploying the functional storage software 40 in the memory 21, the traditional storage software 21 provides a traditional volume 32 to the application computing device 1 and stores data received from the application computing device 1 in the portion of the storage device(s) 23 upon which the traditional volume 32 is configured.

After the functional storage software is deployed at the storage computing device 2, migration is initiated from the traditional volume to the new volume 42, which is also configured on a portion of the storage device(s) 23, or in some cases on other storage device(s) 23 managed by other storage computing devices 2. Further, during the migration, the virtual external device may be generated and employed for accessing data in the traditional volume 32 that has not yet been migrated to the new volume 42, as indicated by the dashed line 24. Details of the actual path for accessing the data in the traditional volume 32 via the virtual external device 45 are discussed additionally below, e.g., with respect to FIGS. 2, 28, and 29.

Figure 2:
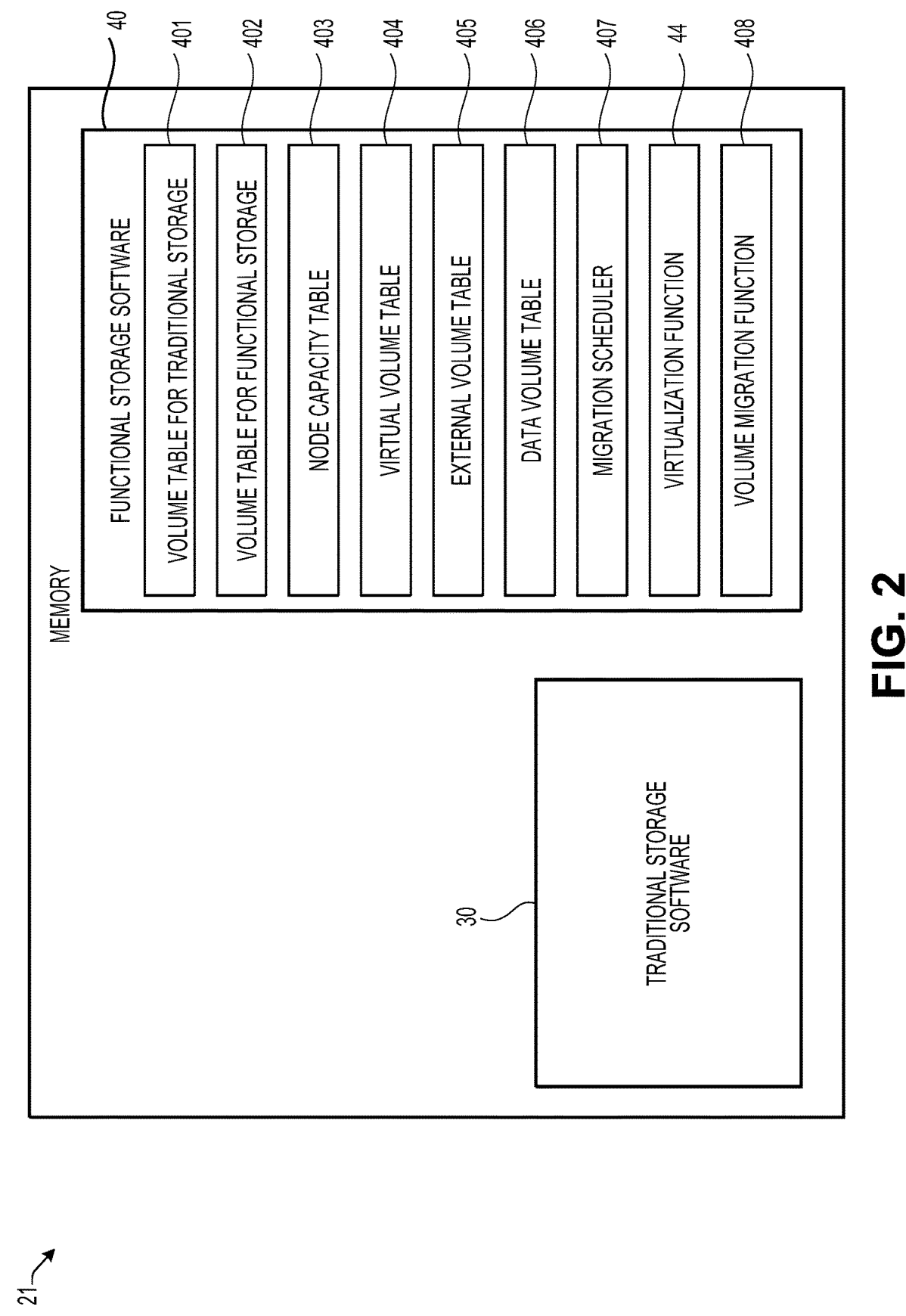
FIG. 2 illustrates various data structures in the memory of a storage computing device according to some implementations.

FIG. 2 illustrates an example configuration of the data structures in the memory 21 managed by the functional storage software 40. For example, the functional storage software 40 manages a volume table for traditional storage 401, a volume table for functional storage 402, a computing device capacity table 403, a virtual volume table 404, an external volume table 405, a data volume table 406, and also includes a migration scheduler 407, the virtualization function 44, and a volume migration function 408. In some implementations, the information managed by the functional storage software in FIG. 2 may be partially stored at each individual storage computing device 2. In other implementations, the information managed by the functional storage software may be stored in a shared manner at each individual storage computing device 2. In still other implementations, the information managed by the functional storage software may be stored at the application computing device 1. In yet other implementations, the information managed by the functional storage software may be stored at a combination of the application computing device and the storage computing device(s).

The migration scheduler 407 may initiate migration of a traditional volume 32 to a functional volume 42, such as in response to a command from the migration tool 16 in some implementations. In other implementations, the migration scheduler 407 may initiate migration of a traditional volume 32 to a functional volume 42 at a predetermined timing after the deployment of the functional storage software 40.

The virtualization function 408 may configure a virtual external device 45 on the storage device 23 for the migration of a respective traditional volume 32. The virtualization function 408 configures the virtual external device 45 and manages a path associated with the traditional volume 32 so that the data of the traditional volume 32 can be continued to be accessed while the traditional volume 32 is migrated. Such communication may be routed from the frontend 41 of the functional storage software 40 to the frontend 31 of the traditional storage software 30 and on to the backend 33 of the traditional storage software 30 so that access via the virtual external device 45 to the data of the traditional volume 32 is not interrupted during the migration processing of migrating the data to the functional volume 42. In some implementations, the virtualization function 408 may also manage another path associated with the functional volume 42 so that the data of the functional volume 32 can be accessed prior to completing the migration of the traditional volume 32. In this manner, continued access of the data of the traditional volume 32 can be provided to the application computing device 1 without interruption thereof.

Figure 3:
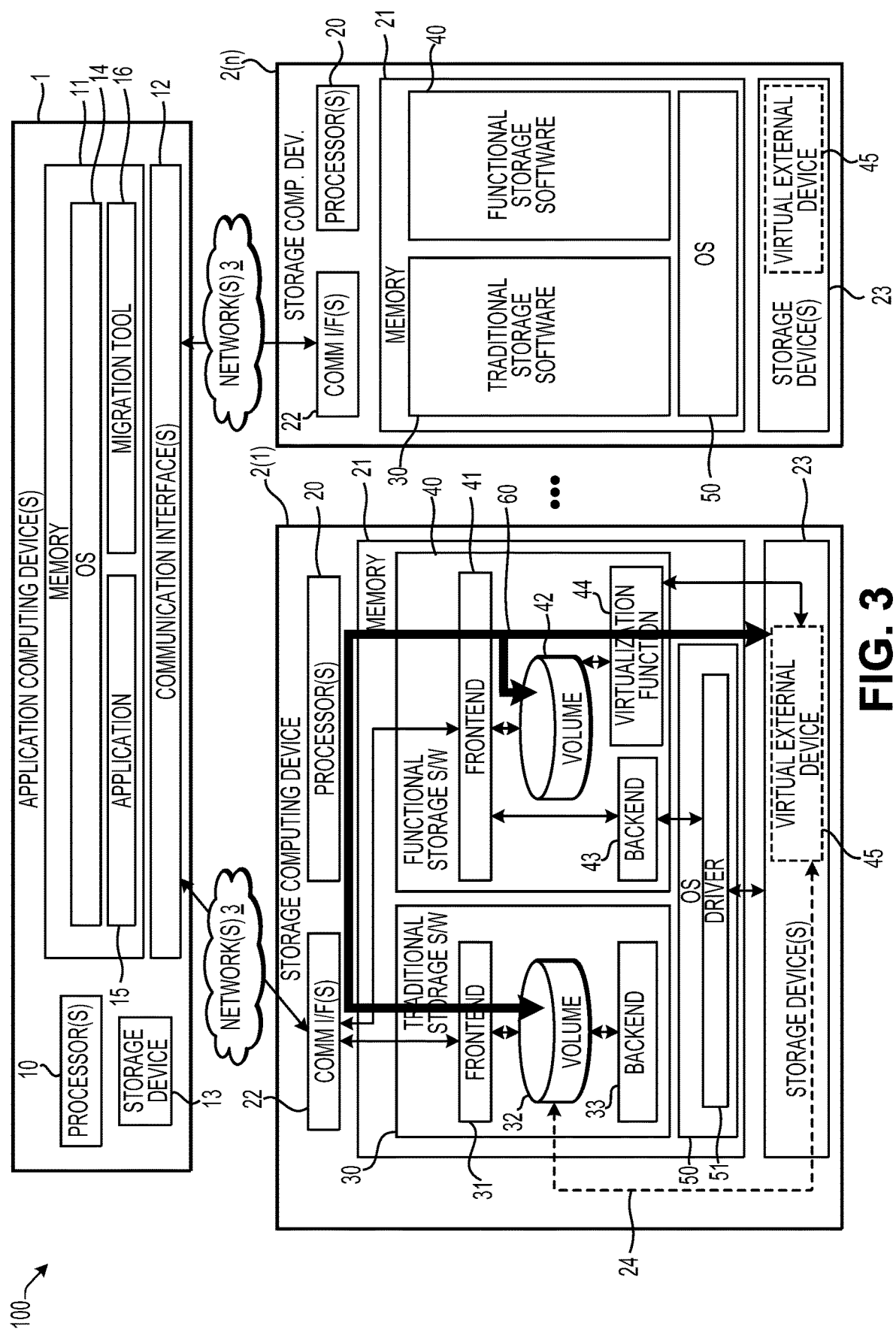
FIG. 3 illustrates a logical path using a virtual external device according to some implementations.

FIG. 3 illustrates the example storage architecture 100 of FIG. 1 with a logical path 60, which is configured by the virtualization function 44 according to some implementations. The logical path 60 is configured to extend between the virtual external device 45 and the traditional volume 32 in the same storage computing device 2. Data migrated between the traditional storage software 30 and the functional storage software 40 may be transferred using the logical path 60 as defined in the external volume table 405. Further, the data migrated between the traditional storage software 30 and the functional storage software 40 is defined to be located at a functional volume 42 as defined in the volume table for functional storage 402 and the virtual volume table 404.

In FIG. 3, the virtualization function 408 configures a virtual external device 45 on the storage device 23 for the migration of a respective traditional volume 32. The virtual external device 45 on the same storage computing device 2 as the traditional volume 32 is configured as a virtual volume which corresponds to the traditional volume 32 via the virtual external device forwarding table 405 by the LUN 3054 of the traditional volume 32. In other words, a logical path 60 may be provided between the virtual external device 45 and the traditional volume 32 by the frontend 41, the frontend 31 and the backend 33. In some implementations, the data of the traditional volume 32 may be migrated to the functional volume 42 via the virtual external device 45 and the path 60. In some implementations, the data of the traditional volume 32 may be accessed by the application computing device 1 via the virtual external device 45 and the path 60 during the migration of the traditional volume 32 to the functional volume 42. Similar functionality may be provided by the paths 61 and 62 discussed below with respect to FIG. 4.

Figure 4:
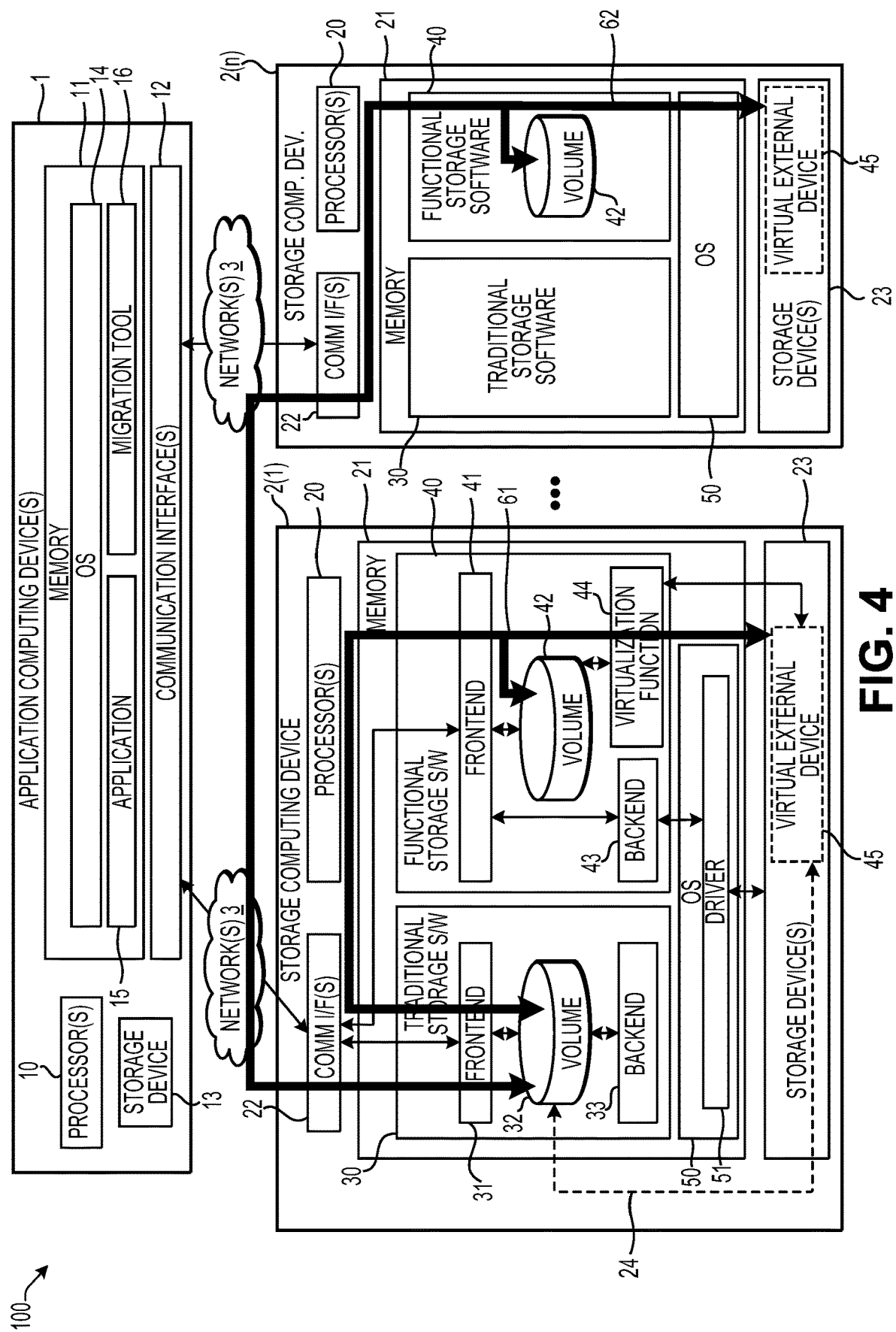
FIG. 4 illustrates logical paths using virtual external devices according to some other implementations.

FIG. 4 illustrates the example storage architecture of FIG. 1 with a logical path 61 which is configured by the virtualization function 44 in a same storage computing device 2(1) as the traditional volume 32, and a logical path 62 which is configured by the virtualization function 44 in a different storage computing device 2(n) as the traditional volume 32 according to some implementations. Accordingly, data to be migrated from the traditional storage software 30 to functional volumes on different storage computing devices, such as traditional volume T5 in FIG. 5, may be transferred by the logical paths 61 and 62.

FIG. 4 shows logical paths using multiple virtual external devices according to some implementations with respect to the example system of FIG. 1. In FIG. 4, the virtualization function 44 configures a virtual external device 45 on the storage device 23 for the migration of a respective traditional volume 32. The virtual external device 45 on the same storage computing device 2 as the traditional volume 32 is configured as a virtual volume which shares correspondence with the traditional volume 32 via the virtual external device forwarding table 405 by a LUN (logical unit number) of the traditional volume 32. In other words, a first logical path 61 may be provided between the virtual external device 45 and the traditional volume 32 by the frontend 41, the frontend 31 and the backend 33. Additionally in FIG. 4, the virtualization function 44 may configure another virtual external device 45 on the storage device(s) 23 for the migration of the respective traditional volume 32. The virtual external device 45 on the different storage computing device 2(n), separate from the traditional volume 32, is configured as a virtual volume which shares correspondence with the traditional volume 32 via the virtual external device forwarding table 405 by the LUN of the traditional volume 32. In other words, a second logical path 62 may be provided between the virtual external device 45 on the second storage computing device 2(n) and the traditional volume 32 by the frontend 41 of the storage computing device 2(n), the frontend 31 and the backend 33. In some implementations, the data of the traditional volume 32 may be migrated to a first functional volume 42 on the same storage computing device 2(1) via the virtual external device 45 and the path 61 and migrated to a second functional volume 42 on the different storage computing device 2(n) via the second virtual external device 45 and the path 62. In some implementations, the data of the traditional volume 32 may be accessed by the application computing device 1 via paths 61 and 62 during the migration of the traditional volume 32 to the functional volume 42.

The volume migration function 408 facilitates the conversion and migration of data from the traditional volume 32 in the first storage format to the functional volume 42 in the second storage format. The processing performed by the volume migration function 408 is discussed additionally below with respect to FIG. 13.

Figure 5:
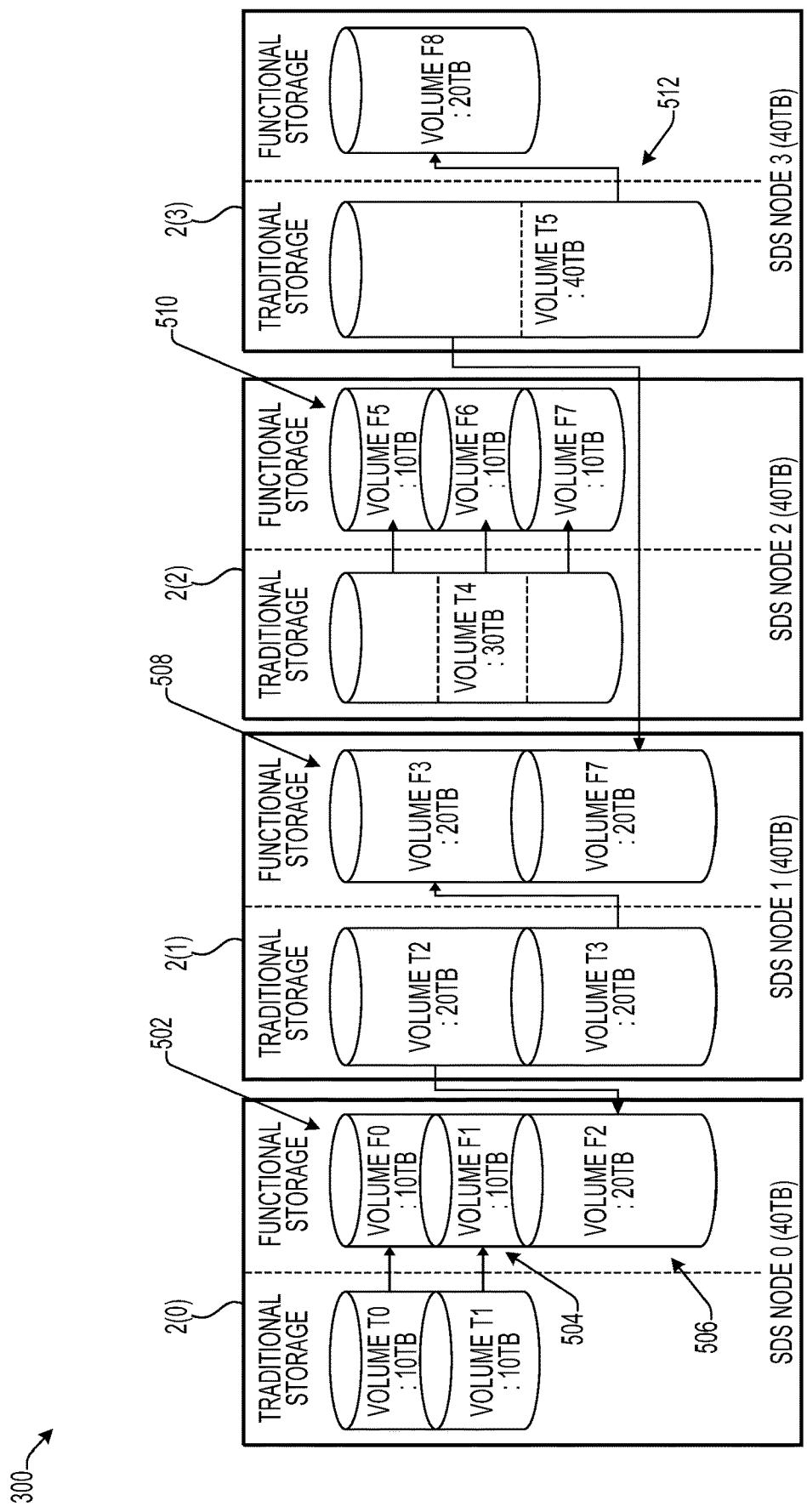
FIG. 5 illustrates an example migration of multiple volumes according to some implementations herein.

FIG. 5 illustrates an example arrangement of four storage computing devices 2(0), 2(1), 2(2), and 2(3). In some examples herein, the storage computing devices may also be referred to as "nodes". In this example, each storage computing device 2(0)-2(3) is assumed to have a storage capacity of 40 TB for simplicity. However, the specific storage capacity can vary in other implementations.

In a first example migration, a traditional volume T0 at the storage computing device 2(0) is migrated to a functional volume F0 at the same storage computing device 2(0), as indicated at 502, where the migrated data is stored by the functional volume F0 in a different format than the traditional volume. Similarly, in a second example migration, as indicated at 504, a traditional volume T1 at the storage computing device 2(0) is migrated to a functional volume F1 at the same storage computing device 2(0) and stored in the storage format different than the traditional volume.

In a third example migration, as indicated at 506, a traditional volume T2 at the storage computing device 2(1) is migrated and converted into a functional volume F2 at the different storage computing device 2(0) due to free storage capacity constraints at the storage computing device 2(1). In a fourth example migration, as indicated at 508, a traditional volume T3 at the storage computing device 2(1) is migrated and converted into a functional volume F3 at the same storage computing device 2(1) due to the migration of the traditional volume T2 creating free storage capacity at the storage computing device 2(1).

In a fifth example migration, as indicated at 510, a traditional volume T4 at the storage computing device 2(2) is split into multiple volumes prior to being migrated and converted into multiple functional volumes F4, F5 and F6 at the same storage computing device 2(2) due to free storage capacity constraints at the storage computing device 2(2). In a sixth example migration, as indicated at 512, a traditional volume T5 at the storage computing device 2(3) is split into multiple volumes prior to being migrated and converted into a functional volume F7 at the different storage computing device 2(1) and into a functional volume F8 at the same storage computing device 2(3) due to free storage capacity constraints at the storage computing device 2(3). Details of each of these migration processes are discussed additionally below.

FIG. 6 illustrates an example volume table 401 for traditional storage 401. In this example, the volume table for traditional storage 401 includes information regarding a traditional volume identifier (ID) 3010, a logical unit number (LUN) 3011, a storage computing device identifier 3012, and a traditional volume size 3013 stored in correspondence for each traditional volume managed by the storage computing device(s). In some implementations, this information may be acquired by the functional storage software 40 from the traditional storage software 30 upon deployment of the functional storage software 40. In some other implementations, this information may be generated by the functional storage software 40 following deployment of the functional storage software 40.

FIG. 7 illustrates an example volume table 402 for functional storage 402. In this example, the volume table 402 for functional storage includes information regarding a volume identifier 3020, a volume type 3021 of 'virtual', 'external' or 'data', a virtual/external/data volume identifier 3022, and a LUN 3022 similar to the LUN 3011 of the volume table for traditional storage 401. In some implementations, this information may be generated by the functional storage software 40 following deployment of the functional storage software 40 and during the migration processing.

FIG. 8 illustrates an example computing device capacity table 403. In this example, the computing device capacity table 303 includes information regarding a storage computing device identifier 3030 similar to the storage computing device identifier 3012, a storage device total capacity 3031, a storage device used capacity 3032, and a storage device free capacity 3033 for each of the storage computing device (s). This information may be generated by the functional storage software 40 following deployment of the functional storage software 40 and during the migration processing. In some implementations, this information may be generated by the functional storage software 40 following deployment of the functional storage software 40, during the migration processing as well as thereafter.

Figure 9:
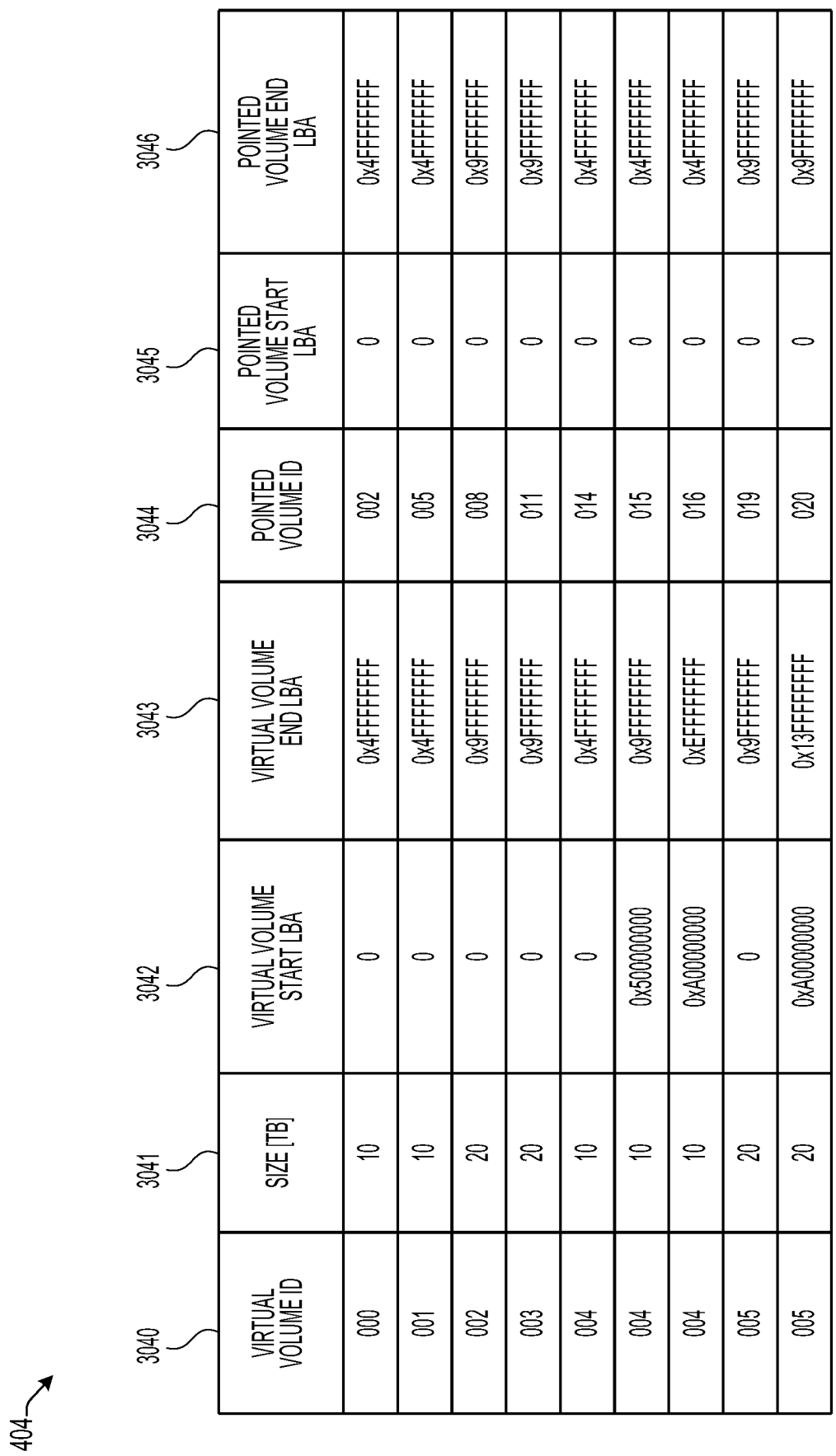
FIG. 9 illustrates a detailed virtual volume mapping table for functional storage software according to some implementations.

FIG. 9 illustrates an example virtual volume table 404. In this example, the virtual volume table 404 includes information regarding a virtual volume ID 3040, a volume size 3041, a virtual volume starting logical block address (LBA) 3042, a virtual volume ending LBA 3043, a pointed volume ID 3044, a pointed volume starting LBA 3045, and a pointed volume ending LBA 3046 stored in correspondence for each functional volume managed by the storage computing device(s). In the first example migration discussed above and shown in FIG. 5, traditional volume T0 has a one-to-one correspondence with functional volume F0 and the virtual volume starting logical block address (LBA) 3042 and the virtual volume ending LBA 3043 are equivalent to the corresponding pointed volume starting LBA 3045 and pointed volume ending LBA 3046. In contrast, traditional volume T4 has a one-to-three correspondence with functional volumes F4, F5, and F6 in FIG. 4. Accordingly, the virtual volume starting logical block address (LBA) 3042 and the virtual volume ending LBA 3043 of traditional volume T4, namely addresses 0 to 0xEFFFFFFFF are mapped in the virtual volume table to three separate address spaces as shown in the corresponding pointed volume starting LBA 3045 and pointed volume ending LBA 3046 of the pointed volume IDs. In some implementations, this information may be generated by the functional storage software 40 during the migration processing and managed thereafter.

FIG. 10 illustrates an example external virtual volume table 405. In this example, the external virtual volume table 405 includes information regarding an external volume ID 3050, a volume size 3051, an external storage name 3052, a network location 3053, and LUN 3054 similar to the LUN 3022 of the volume table for functional storage 402 and the LUN 3011 of the volume table for traditional storage 401. In some implementations, this information may be generated by the functional storage software 40 during the migration processing.

Figure 11:
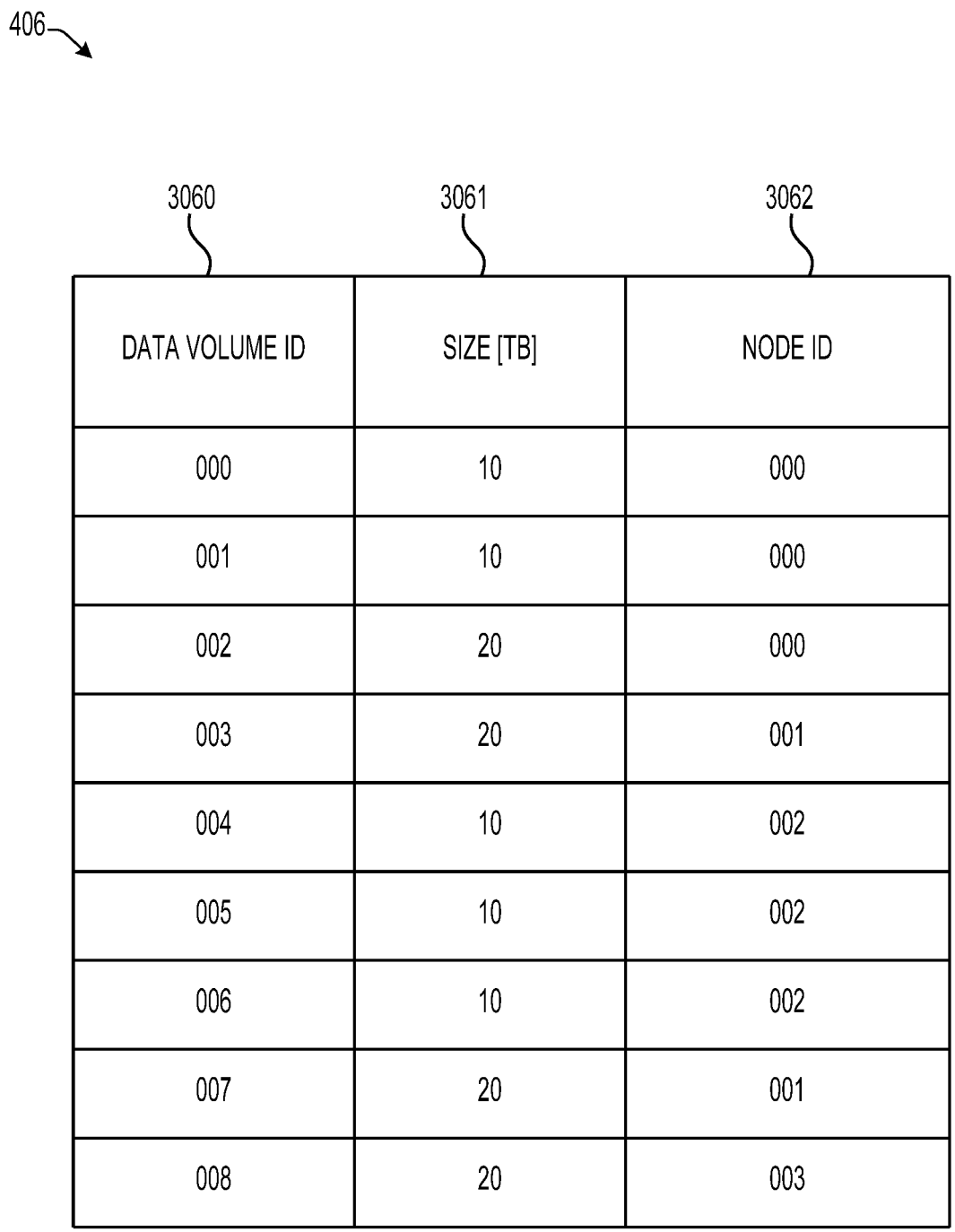
FIG. 11 illustrates a detailed functional volume table for functional storage software according to some implementations.

FIG. 11 illustrates an example data volume table 406. In this example, the data volume table 406 includes information regarding a data volume ID 3060, a volume size 3061, and a computing device ID 3062 for each of the functional volumes 42. In some implementations, this information may be generated by the functional storage software 40 during the migration processing and managed thereafter.

Figure 12:
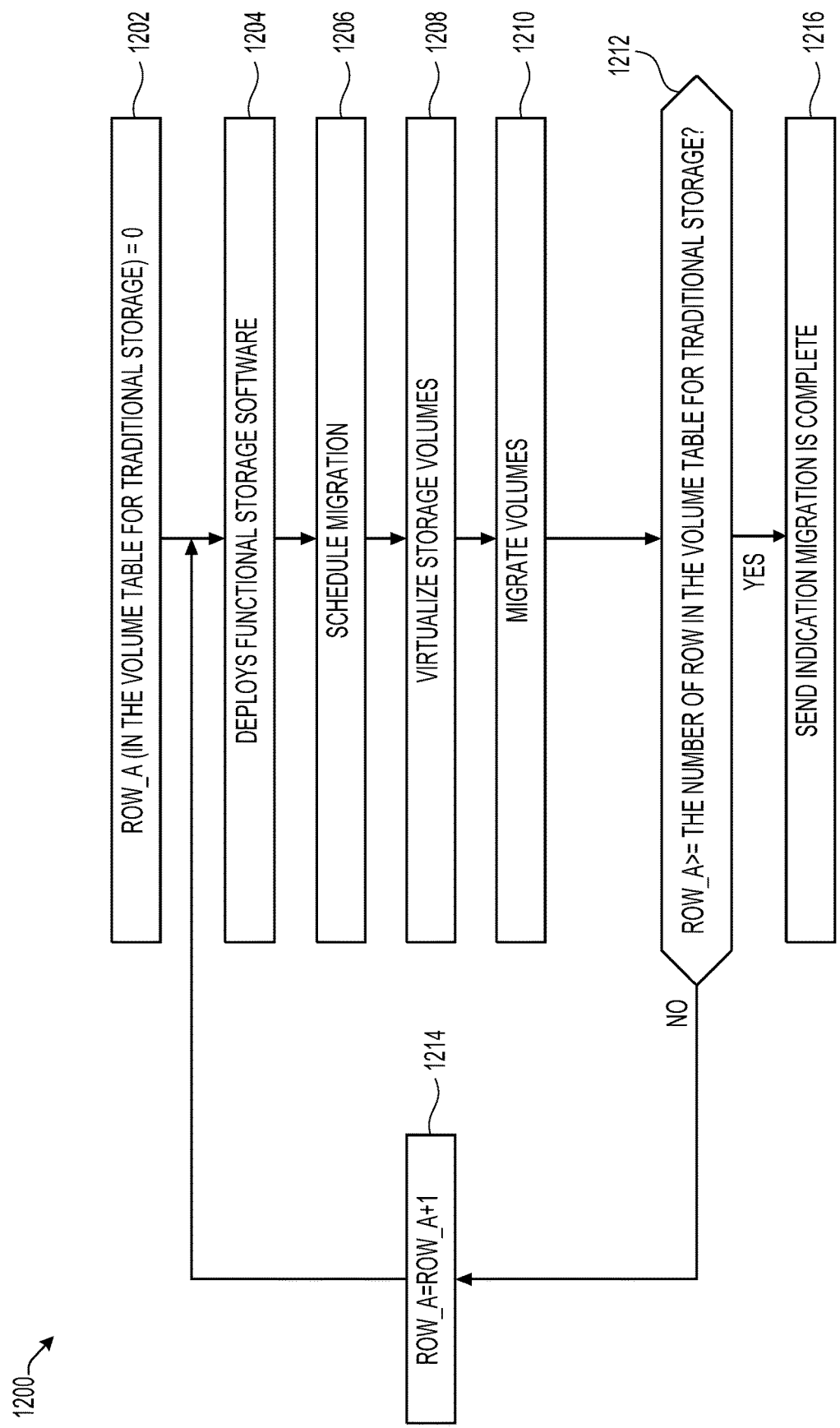
FIG. 12 illustrates an example migration flow processing for multiple traditional volumes according to some implementations.
Figure 13:
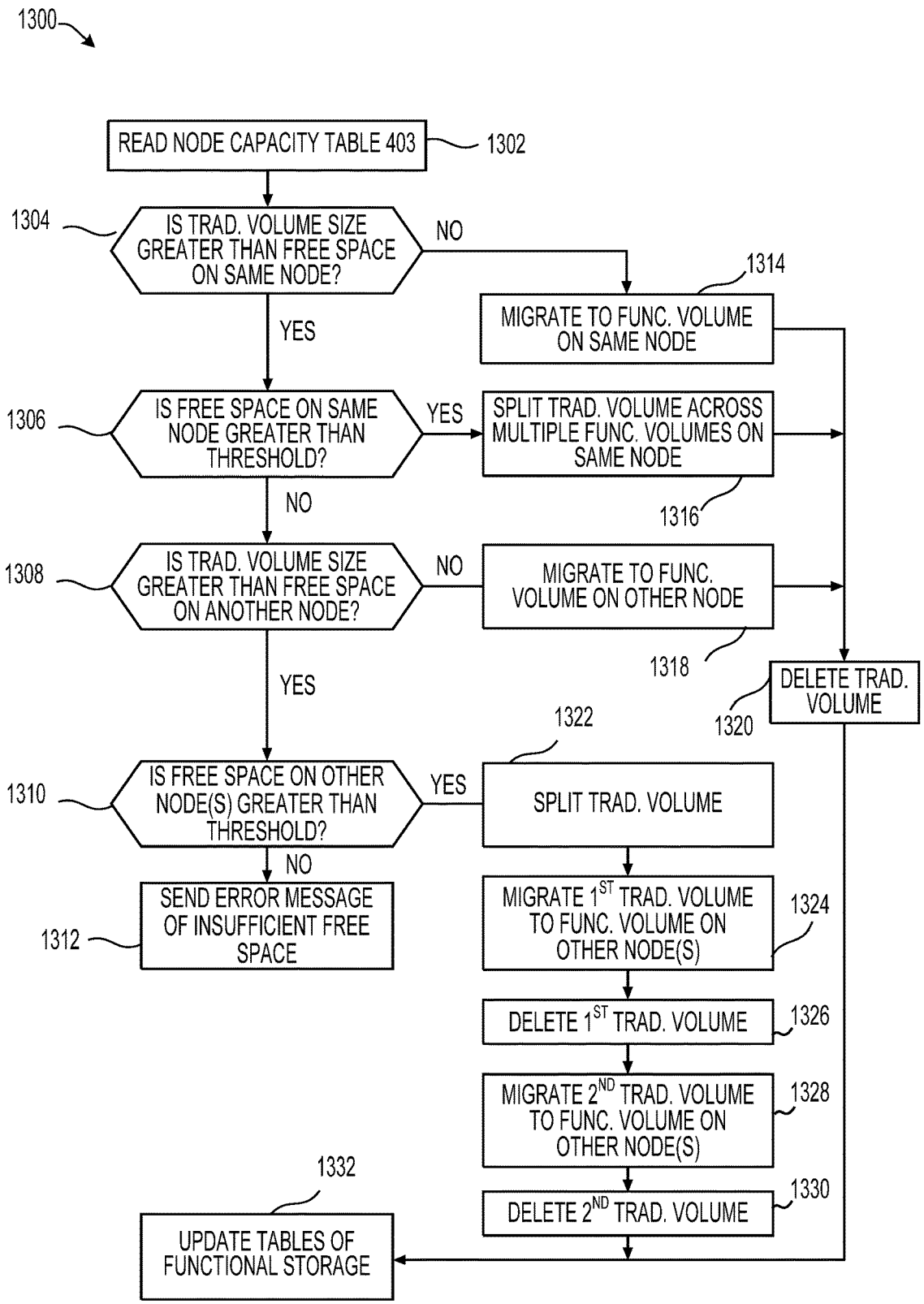
FIG. 13 illustrates a detailed migration flow for a given traditional volume according to some implementations.

FIGS. 12 and 13 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 12 is a flow diagram illustrating an example process 1200 for migrating the traditional volume(s) of the traditional storage software 30 at one or more storage computing device(s). In some cases, the migrating process in FIG. 12 may be initiated by the migrating tool 16 of the application computing device 1. In other cases, the migrating process may be initiated by the functional storage software 40 of the storage computing device(s) 2 themselves. In FIG. 12, the migration tool may initiate execution of the migration process independently, or in response to receiving an input from a user or another process.

At 1202, the migration tool sets a counter 'row_a' equal to 0. The counter 'row_a' is used as an index to process each traditional volume 32 of the traditional storage software 30.

At 1204, after setting the counter 'row_a' equal to 0, the functional storage software 40 is deployed at the storage computing devices 2. Upon deployment, the functional storage software 40 is caused to initialize a volume table for traditional storage 401, a volume table for functional storage 402, a computing device capacity table 403, a virtual volume table 404, an external volume table 405, and a data volume table 406 in the memory 21 of the storage computing devices 2. For example, the volume table for traditional storage 401 is populated with a traditional volume identifier (ID) 3010, a logical unit number (LUN) 3011, a storage computing device identifier 3012, and a traditional volume size 3013 stored in correspondence for each traditional volume 32 managed by the traditional storage software 30. Further, the computing device capacity table 303 is populated with the information regarding a storage computing device identifier 3030 similar to the storage computing device identifier 3012, a storage device total capacity 3031, a storage device used capacity 3032, and a storage device free capacity 3033 for each of the storage computing device(s).

At 1206, after deploying the functional storage software 40 at the storage computing devices 2, the migration of the traditional volume(s) is scheduled. In some implementations, migration may be scheduled to occur directly following deployment of the functional storage software 40. In other implementations, the migration scheduler 407 may schedule migration a predetermined time after deployment of the functional storage software 40. In yet other implementations, the migration scheduler 407 may schedule migration according to an instruction from the migration tool 16. For example, a row of the volume table for traditional storage 401 corresponding to the counter 'row_a' is referenced and the listed traditional volume 32 is identified by the volume ID 3010. A corresponding LUN 3022 is created for the LUN 3011 in the volume table for functional storage 402.

At 1208, an area of the storage device 23 at the same storage computing device 2 as the listed traditional volume 32 in the volume table for traditional storage 401 is virtualized. Namely, the virtualization function 44 creates three virtual volumes corresponding to the LUN 3011, 3022.

First, the virtualization function 44 creates a virtual volume corresponding to the LUN 3022 and updates the volume table for functional storage 402 with a volume ID 3020 of the virtual volume and a volume type 3021 of 'virtual'.

Second, the virtualization function 44 further creates a virtual external device 45 corresponding to the LUN 3022 and updates the volume table for functional storage 402 with a volume ID 3020 of the virtual external device 44 and a volume type of 3021. The virtualization function 44 then updates the external volume table 305 to associate the volume ID 3020 of the virtual external device 44, which corresponds to the external volume ID 3050 with the LUN 3054 corresponding to the LUN 3011 of the traditional volume 30. Further, a size 3051, an external storage name such as 'traditional storage' 3052, and a network location 3053 corresponding to the LUN 3011 of the traditional volume 30 are listed in the external volume table 305. As a result, a virtual path is established between the respective virtual volume listed in the volume table for functional storage 402 and the respective traditional volume 32 listed by LUN 3054. The significance of this virtual path will be explained later with respect to the actual migration processing of the respective traditional volume 32.

Third, the virtualization function 44 further creates a functional data volume 42 corresponding to the LUN 3022 and updates the volume table for functional storage 402 with a volume ID 3020 of the virtual external device 45. This functional data volume 42 is to serve as the storage location which receives the data of the traditional volume 32 and stores said data in the second storage format of the functional storage software 40.

At 1210, after the processing for the row of the volume table for traditional storage 401 corresponding to the counter 'row_a' is completed, the processing continues to migrating the traditional volume 32 identified by volume ID 3010 and LUN 3011 in the volume table for traditional storage 401. At this time, a virtual volume, a virtual external device 45, and a functional volume 42 have been associated with the LUN 3011, 3022 in the volume table for functional storage 402. In other words, the storage device 23 is configured to receive data in the first storage format in the given traditional volume 32 which is to be migrated and converted to the second storage format and stored in the given functional volume 42. An exemplary processing flow of such migration is shown in FIG. 13.

At 1212, the process determines if the current row is greater than or equal to the last row. If so, the process goes to 1216; if not, the process goes to 1214 to process the next row.

At 1214, the row counter is incremented by one and the process goes to 1204.

At 1216, the migration is completed and the process may send an indication that the migration is complete.

FIG. 13 is a flow diagram illustrating a process 1300 for migrating a traditional volume of the traditional storage software 30 to a functional volume of the functional storage software 40, which, in some examples, may correspond to 1210 of FIG. 12 and the volume migration function 408 shown in FIG. 2.

At 1302, upon initiating the migration process, the computing device capacity table 403 is referenced to determine a free capacity 3033 listed in correspondence with the computing device ID 3030 of the storage computing device 2 at which the respective functional volume 32 is located.

At 1304, it is determined whether the determined free capacity 3033 at the same storage computing device 2 is greater than the traditional volume size 3013 listed in correspondence with the LUN 3011 of the functional volume 32. When the determined free capacity 3033 is greater than the traditional volume size 3013, the processing flow moves to 1306.

At 1306, it is determined whether the determined free capacity 3033 at the same storage computing device 2 is greater than a predetermined threshold value. When the determined free capacity 3033 is not greater than the predetermined threshold value, the processing flow moves to 1308.

At 1308, it is determined whether the traditional volume size 3013 listed in correspondence with the LUN 3011 of the functional volume 32 is greater than another free capacity 3033 at a different storage computing device 2 listed in the computing device capacity table 403. When the traditional volume size 3013 is greater than the free capacity 3033 at any other different storage computing device 2, the processing flow moves to 1310.

At 1310, it is determined whether the listed free capacity 3033 at any other storage computing device 2 is greater than the predetermined threshold value. When no other storage computing device 2 has a free capacity 3033 is greater than the predetermined threshold value, the processing flow moves to 1312 where the volume migration function 48 returns an error message that insufficient free space exists in the storage computing devices 2 to migrate the respective traditional volume being processed at 1210. In some implementations, this error message may be forwarded to the application computing device 1.

Returning to 1304, when the determined free capacity 3033 on the same storage computing device 2 is not greater than the traditional volume size 3013, the processing flow moves to 1314.

At 1314, the data of the traditional volume 32 in the first storage format is migrated to the functional data volume having the LUN 3022 corresponding to the LUN 3011 of the traditional volume 32 via the path 60. In some implementations, during the data migration, the application computing device 1 is directed to access the data of the traditional volume 32 via the virtual external device 45 and the path 60 shown in FIG. 14. At this time, I/O requests to the data received by the frontend 41 may be directed to the traditional volume 32 using the path setting in the external volume table 405 via the path 60. Further, an entry in the virtual volume table 404 is generated which associates the virtual volume 3021 with the functional data volume 3021 sharing the LUN 3022. More specifically, a virtual volume ID 3040, a size 3041 and starting and ending LBAs of the virtual volume 3021 are listed in correspondence with a pointed volume ID 3044 and starting and ending LBAs of the functional data volume 3021. The migration at 1314 corresponds, for example, to the one-to-one migration of the traditional volume T0 to the functional volume F0 in FIG. 5. Following the completion of 1314, the traditional volume 32 may be deleted along with the virtual external device 45 at 1320 and the tables 401, 402, 403, 404, 405 and 406 in the memory 21 are then updated accordingly at 1332 to reflect the state of the functional volume 42.

Returning to 1304, when the determined free capacity 3033 of the same storage computing device 2 is greater than the predetermined threshold value, the processing flow moves to 1306.

At 1306, the data of the traditional volume 32 in the first storage format may be split into multiple units equal to or less than the predetermined threshold value and sequentially migrated to multiple functional data volumes having the LUN 3022 corresponding to the LUN 3011 of the traditional volume 32 via the path 60. For example, the sequential migration may include migrating a first unit, equal in size to the predetermined threshold, of the traditional volume 32 to a first functional volume 42 similar to the migration of a first segment of the traditional volume T4 to functional volume F4 in FIG. 5. Thereafter, the first unit may be deleted to create a free available space equal in size to the predetermined threshold. Then, a second unit of the traditional volume 32 may be migrated to a second functional volume 42 similar to the migration of a second segment of the traditional volume T4 to functional volume F5 in FIG. 5. Similar processing may continue as needed to migrate the entirety of the traditional volume 32 and the number of repetitions may depend on the size of the traditional volume 32 and the predetermined threshold value. In some other implementations, the size of each of the units may be determined based on the determined free capacity 3033 rather than the predetermined threshold value.

In some implementations, during the data migration, the application computing device 1 is directed to access the data of the traditional volume 32 via the virtual external device 45 and the path 60. At this time, I/O requests to the data received by the frontend 41 may be directed to the traditional volume 32 using the path setting in the external volume table 405 via the path 60. In other implementations, I/O requests to the data received by the frontend 41 may be directed to the traditional volume 32 using the path setting in the external volume table 405 via the path 60 or to the corresponding one of the functional data volumes 42 based on the migration status of the units of the split traditional data volume 32. In some implementations, multiple entries in the virtual volume table 404 are generated which associates the virtual volume 3021 with the multiple functional data volumes 3021 sharing the LUN 3022. More specifically, a virtual volume ID 3040, a size 3041 and starting and ending LBAs of the virtual volume 3021 are listed in correspondence with multiple pointed volume IDs 3044 and starting and ending LBAs of the multiple functional data volumes 3021.

At 1306, the migration corresponds, for example, to the one-to-many migration of the traditional volume T4 to the functional volumes F4, F5, and F6 in FIG. 5. This processing is similar to the flow shown at 1322 to 1330 where the traditional volume 32 is split into multiple units and migrated sequentially.

At 1320, following the completion of 1316, the traditional volume 32 and the virtual external device 45 may be deleted at 1320 and the tables 401, 402, 403, 404, 405 and 406 in the memory 21 may then be updated accordingly at 1332 to reflect the state of the multiple functional volumes 42 at the same storage computing device 2.

Returning to 1308, when the traditional volume size 3013 is not greater than a determined free capacity 3033 on a different storage computing device 2, the processing flow moves to 1318.

At 1318, at this time, the functional data volume having the LUN 3022 is set at the different storage computing device 2, rather than the same storage computing device as the functional data volume corresponding to the LUN 3011 of the traditional volume 32. At 1318, the data of the traditional volume 32 in the first storage format is migrated to the functional data volume having the LUN 3022 corresponding to the LUN 3011 of the traditional volume 32 via the path 62. In some implementations, during the data migration, the application computing device 1 is directed to access the data of the traditional volume 32 via the virtual external device 45 and the path 62 of the different storage computing device 2 similar to FIG. 15. In some implementations, I/O requests to the data received by the frontend 41 may be directed to the functional volume 32 using the corresponding path setting to the functional volume 32 listed in the external volume table 405. Further, an entry in the virtual volume table 404 is generated which associates the virtual volume 3021 at the different storage computing device 2 with the functional data volume 3021 sharing the LUN 3022 at the different storage computing device 2. More specifically, a virtual volume ID 3040, a size 3041 and starting and ending LBAs of the virtual volume 3021 at the different storage computing device 2 are listed in correspondence with a pointed volume ID 3044 and starting and ending LBAs of the functional data volume 3021 at the different storage computing device 2. The migration at 1318 corresponds, for example, to the one-to-one migration of the traditional volume T2 to the functional volume F2 in FIG. 5. Following the completion of 1318, the traditional volume 32 and the virtual external device 45 may be deleted at 1320 and the tables 401, 402, 403, 404, 405 and 406 in the memory 21 may then be updated accordingly at 1332 to reflect the state of the functional volume 42 having the data migrated thereto at the different storage computing device 2.

Returning to 1310, when the determined free capacity 3033 of a different storage computing device 2 is greater than the predetermined threshold value, the processing flow moves to 1322.

Figure 15:
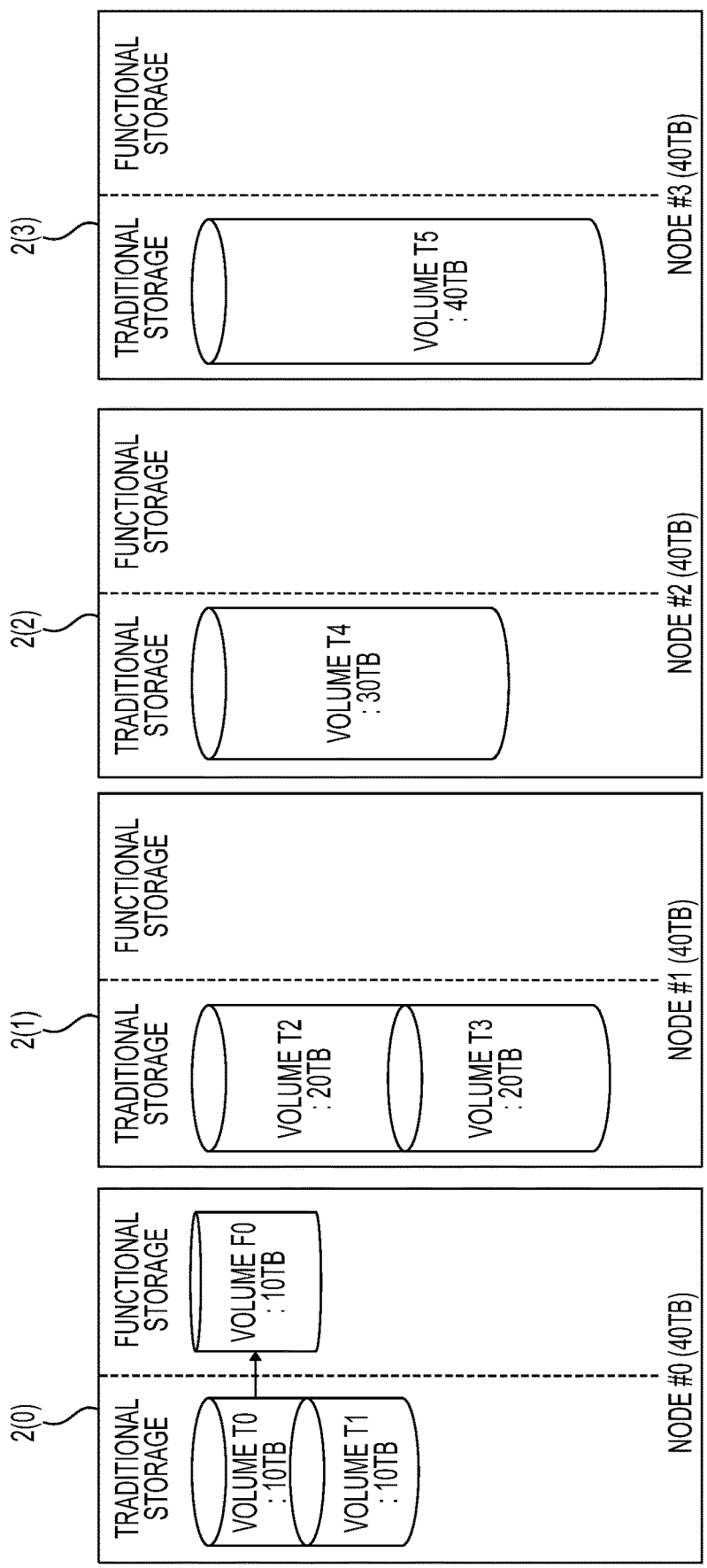
FIG. 15 illustrates a subsequent state to FIG. 14 according to some implementations.

At 1322, the data of the traditional volume 32 in the first storage format may be split into units equal to the predetermined threshold value and sequentially migrated to multiple functional data volumes on multiple storage computing devices which are set to have the LUN 3022 corresponding to the LUN 3011 of the traditional volume 32 via the paths 61 and 62 as illustrated in FIG. 4 discussed above. In some implementations, during the data migration, the application computing device 1 is directed to access the data of the traditional volume 32 via the virtual external device 45 on the same storage computing device 2 as the traditional volume and the path 61 or via the virtual external device 45 on the different storage computing device 2 as the traditional volume and the path 62 as shown in FIG. 15. At this time, I/O requests to the data received by the frontend 41 may be directed to the traditional volume 32 using the path setting in the external volume table 405 via the paths 61 and 62. In other implementations, I/O requests to the data received by the frontend 41 may be directed to the traditional volume 32 using the path setting in the external volume table 405 via the paths 61 and 62 or to the corresponding one of the functional data volumes 42 based on the migration status of the units of the split traditional data volume 32. In some implementations, multiple entries in the virtual volume table 404 are generated which associates the virtual volume 3021 with the multiple functional data volumes 3021 sharing the LUN 3022. More specifically, a virtual volume ID 3040, a size 3041 and starting and ending LBAs of the virtual volume 3021 are listed in correspondence with multiple pointed volume IDs 3044 and starting and ending LBAs of the multiple functional data volumes 3021.

At 1324, a first unit of the traditional volume 32 is migrated to a functional volume 42 at the different storage computing device 2.

At 1326, the first unit of the traditional volume 32 is deleted. The deletion of the first unit of the traditional volume 32, allows for a corresponding amount of storage capacity to be freed at the storage computing device 2 where the traditional volume 32 is located.

At 1328, following 1326, a second unit of the traditional volume 32 may then be migrated to the functional volume 32 at the same storage computing device 2 as the traditional volume 32.

At 1330, upon completion of the migration of the second unit of the traditional volume 32 at 1328, the second unit of the traditional volume 32 may be deleted. Processing may then continue to 1332 as previously discussed above.

At 1332, the tables of the functional storage software are updated.

Furthermore, it should be appreciated that other implementations may include splitting the traditional volume 32 into more than two units as shown in FIG. 5 and at 1322 in FIG. 13. For simplicity, the implementation described in FIG. 13 shows that the traditional volume 32 (e.g., traditional volume T5 in FIG. 5) is merely split into 2 units. However, it should be appreciated that the traditional volume 32 may be split into other numbers of units.

The migration at 1322 to 1330 corresponds, for example, to the one-to-many migration of the traditional volume T5 to the multiple functional volumes F7 and F8 in FIG. 5. Following the completion of the migration of each unit of the traditional volume 32, the units of the traditional volume 32 may be separately deleted at 1326 and 1330 and the tables 401, 402, 403, 404, 405 and 406 in the memory 21 updated at 1332 accordingly to reflect the state of the functional volume 42. During the processing shown at 1316 and 1322 to 1330, it should be appreciated that I/O access to the data of the split traditional volume 32 is maintained by the virtual paths defined in the external volume table 405. For example, in FIG. 5, after functional volume F7 stores the first unit of the traditional volume T5, I/O access to the first unit of the traditional volume T5, now stored by the functional volume F7, is directed to the frontend 41 of the storage computing device 2 storing the functional volume F7. Likewise, I/O access to the second unit of the traditional volume T5 may be provided by the virtual external device defined for the traditional volume T5 in the external volume table 405. Accordingly, I/O access to the data of a traditional volume can be maintained during the migration processing shown in FIGS. 12 and 13.

Following 1332 and also 1312 in FIG. 13, the processing flow returns to 1212 of FIG. 12 where the 'row_a' is compared to determine whether the value of 'row_a' is equal to or greater than a number of rows listed in the volume table for traditional storage 401. In other words, 1212 determines whether another traditional volume 32 is listed in the volume table for traditional storage 401 which has yet to be processed. In such circumstances, the processing flow continues to 1214 where the value of 'row_a' is incremented by a value of 1 before returning to 1204. As such, migration processing continues for the remaining unprocessed tradition storage volumes 32.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 14:
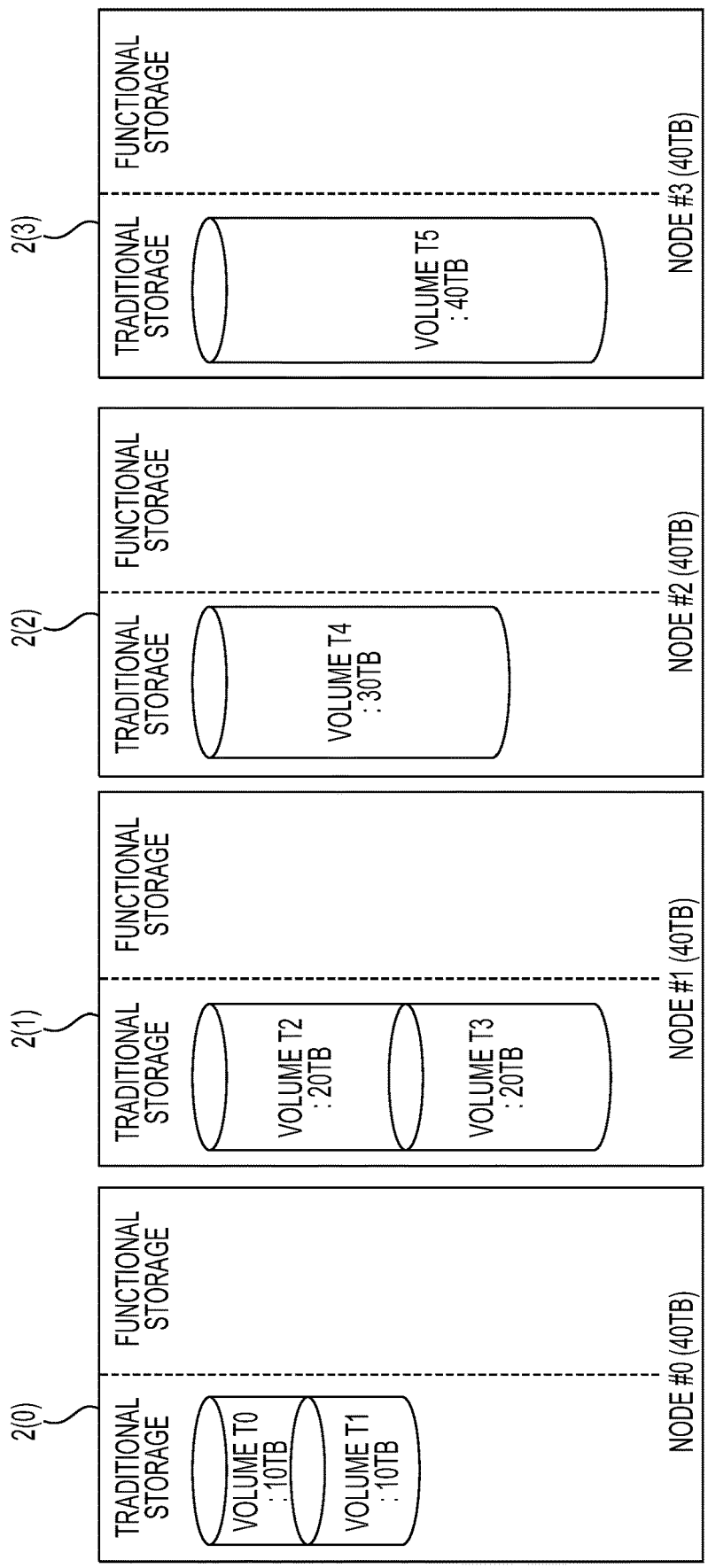
FIG. 14 illustrates an initial state prior to migration multiple traditional volumes according to some implementations.

FIG. 14 illustrates an initial state prior to migration for a system comprising the four storage computing devices 2(0)-2(3) as discussed with respect to FIG. 5. Each of the storage computing devices 2(0)-2(3) is assumed to have a total capacity of 40 TB similar to the computing device capacity table 403 in FIG. 8. Accordingly, the storage computing device 2(0) has 20 TB of available storage capacity. The storage computing device 2(1) has 0 TB of available storage capacity. The storage computing device 2(2) has 10 TB of available storage capacity and the storage computing device 2(3) has 0 TB of available storage capacity.

In FIG. 15, the traditional volume T0 at the storage computing device 2(0) is migrated to the functional volume F0 at the same storage computing device 2(0) where the migrated data is stored by the functional volume F0 in a different storage format than in the traditional volume T0.

Figure 16:
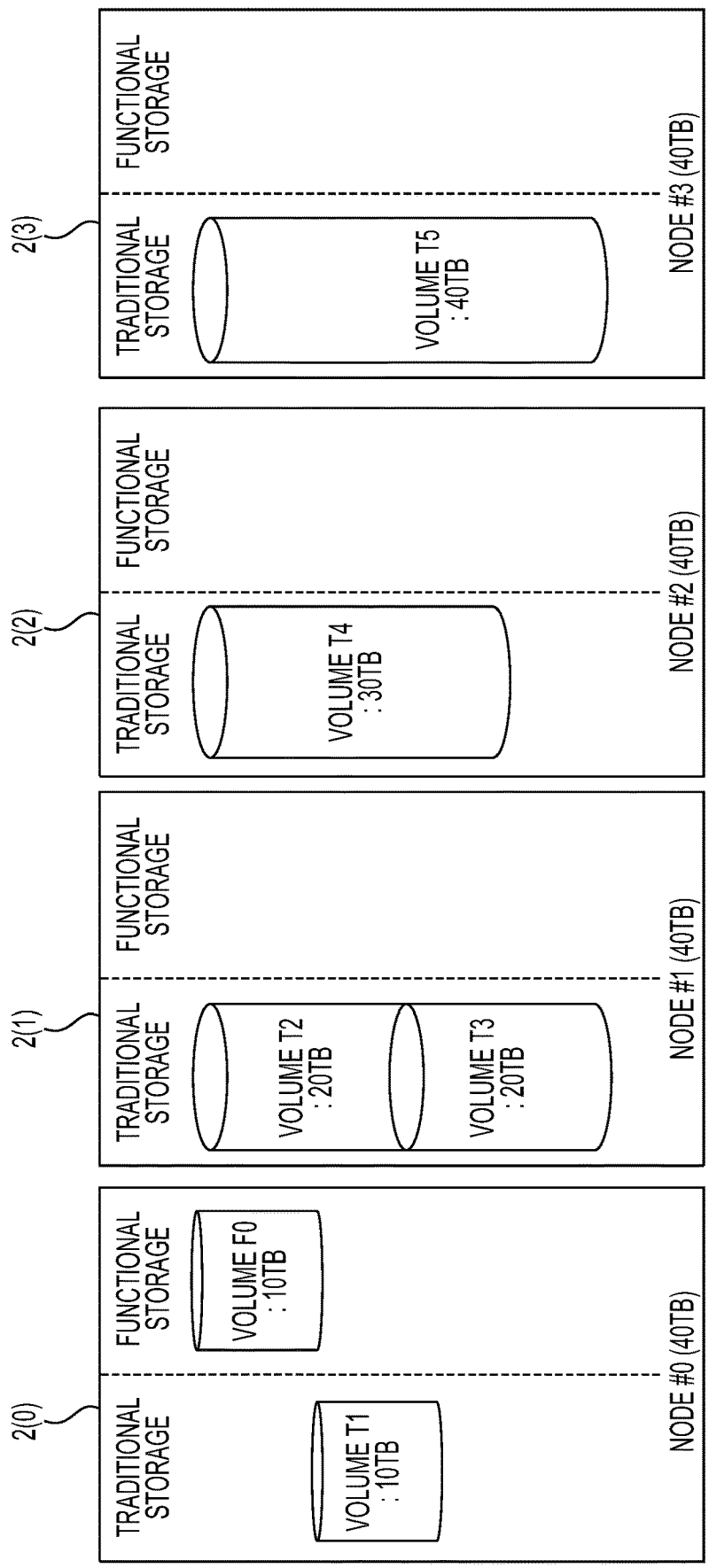
FIG. 16 illustrates a subsequent state to FIG. 15 according to some implementations.

In FIG. 16, after migration of the data, the traditional volume T0 may be deleted to add the storage capacity used by the traditional volume T0 to the free capacity 3033 of the storage computing device 2(0). In FIG. 16, the storage computing device 2(0) has 20 TB of available storage capacity as the functional volume F0 and the traditional volume T1 each occupy 10 TB of storage capacity.

Figure 17:
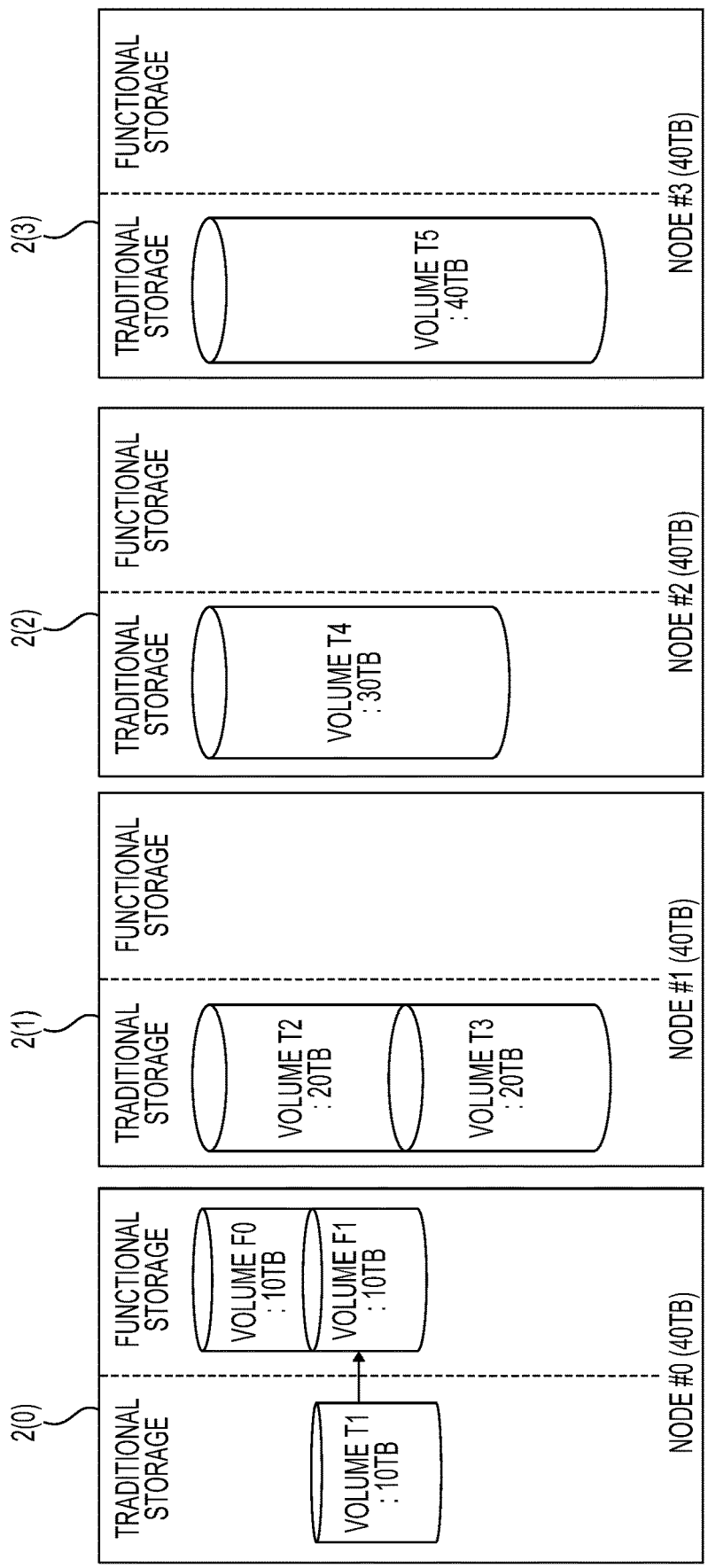
FIG. 17 illustrates a subsequent state to FIG. 16 according to some implementations.

In FIG. 17, similar to the migration of the traditional volume T0, the traditional volume T1 may be migrated to a functional volume F1 at the storage computing device 2(0).

Figure 18:
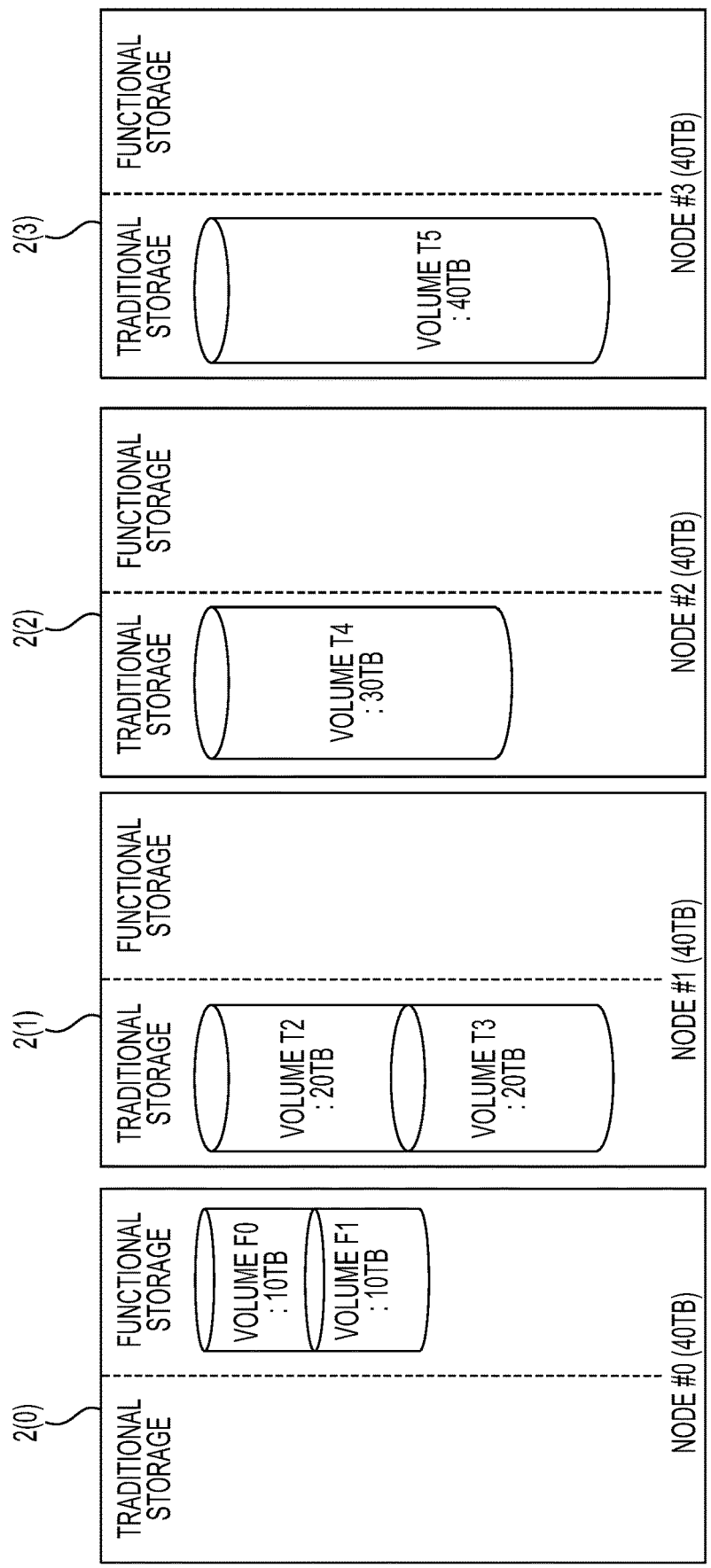
FIG. 18 illustrates a subsequent state to FIG. 17 according to some implementations.

In FIG. 18, after the migration of the traditional volume T0 to the functional volume F1 is completed, the traditional volume T1 may be deleted. In the state shown in FIG. 18, the storage computing device 2(0) has 20 TB of available storage capacity as the functional volume F0 and the functional volume F1 each occupy 10 TB of storage capacity. FIGS. 15 to 18 may correspond to the processing of 1314 and 1320 in FIG. 13.

Figure 19:
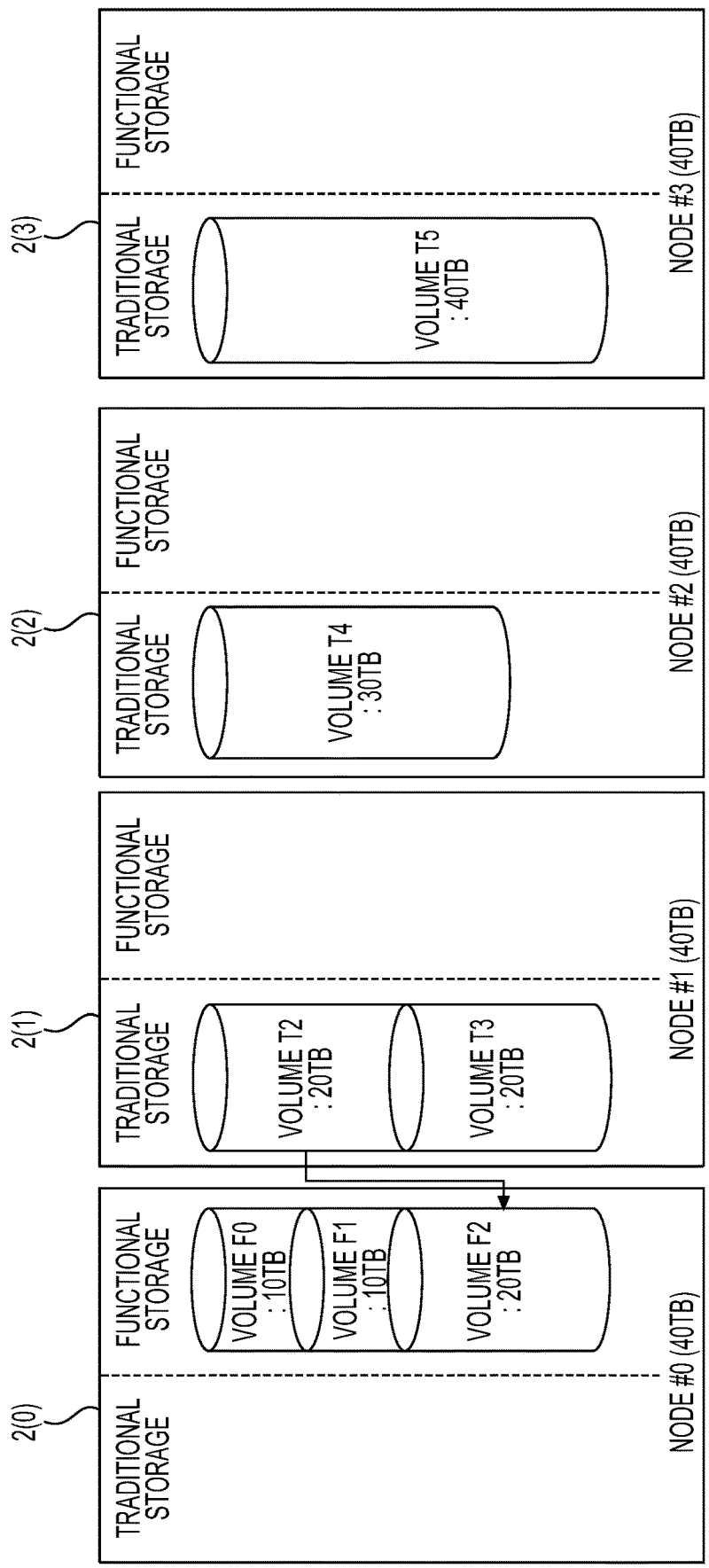
FIG. 19 illustrates a subsequent state to FIG. 18 according to some implementations.

In FIG. 19, the traditional volumes T2 and T3 are 20 TB each and the storage computing device 2(1) has no free storage capacity available. Accordingly, the traditional volume T2 is migrated to the functional volume F2 on the different storage computing device 2(0) which has 20 TB of free storage capacity in the state shown in FIG. 18.

Figure 20:
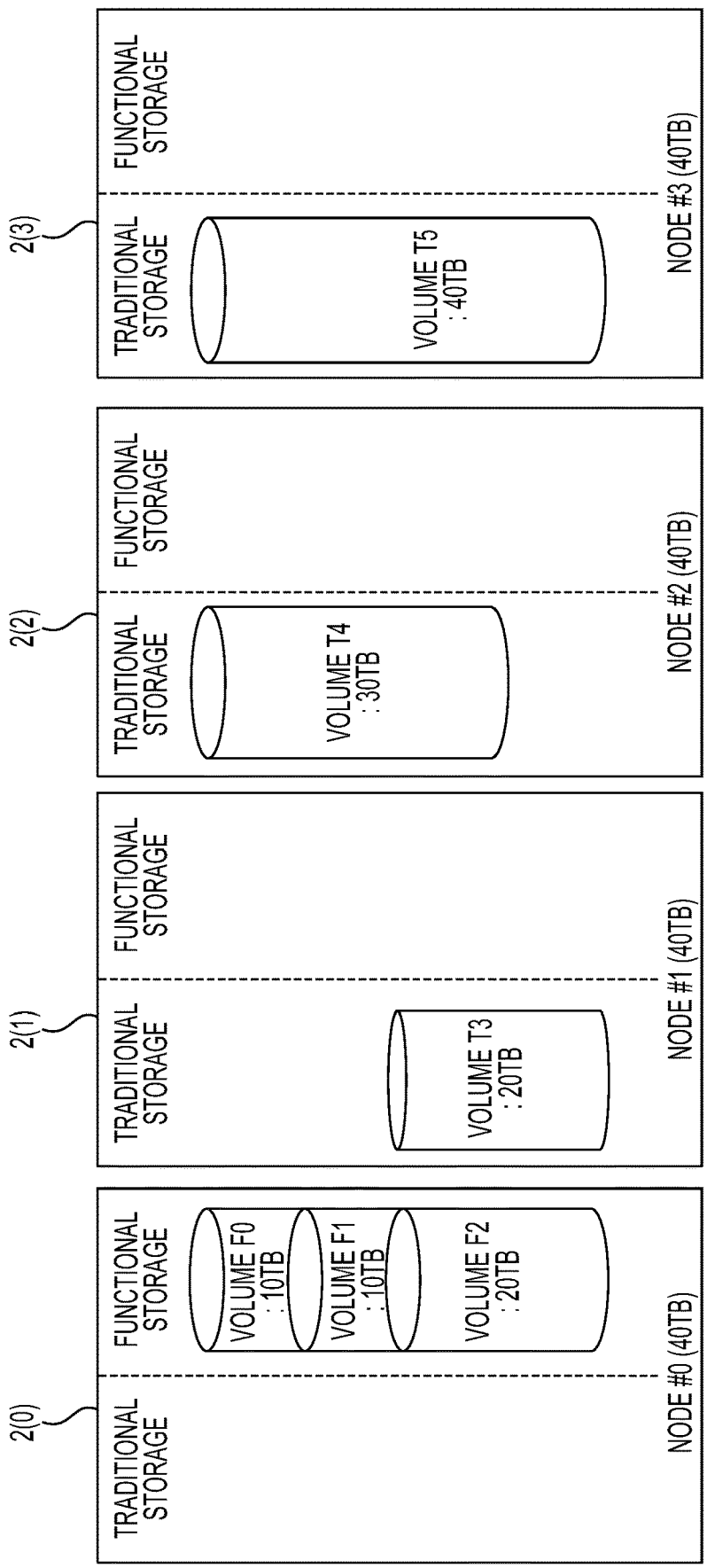
FIG. 20 illustrates a subsequent state to FIG. 19 according to some implementations.

In FIG. 20, after migration of the data, the traditional volume T2 may be deleted to free the storage capacity used by the traditional volume T2 to the free capacity of the storage computing device 2(1). FIGS. 18 to 20 correspond to the processing of 1318 and 1320 in FIG. 13. In FIG. 20, following the deletion of the traditional volume T2, 20 TB of free storage capacity is made available at the storage computing device 2(1).

Figure 21:
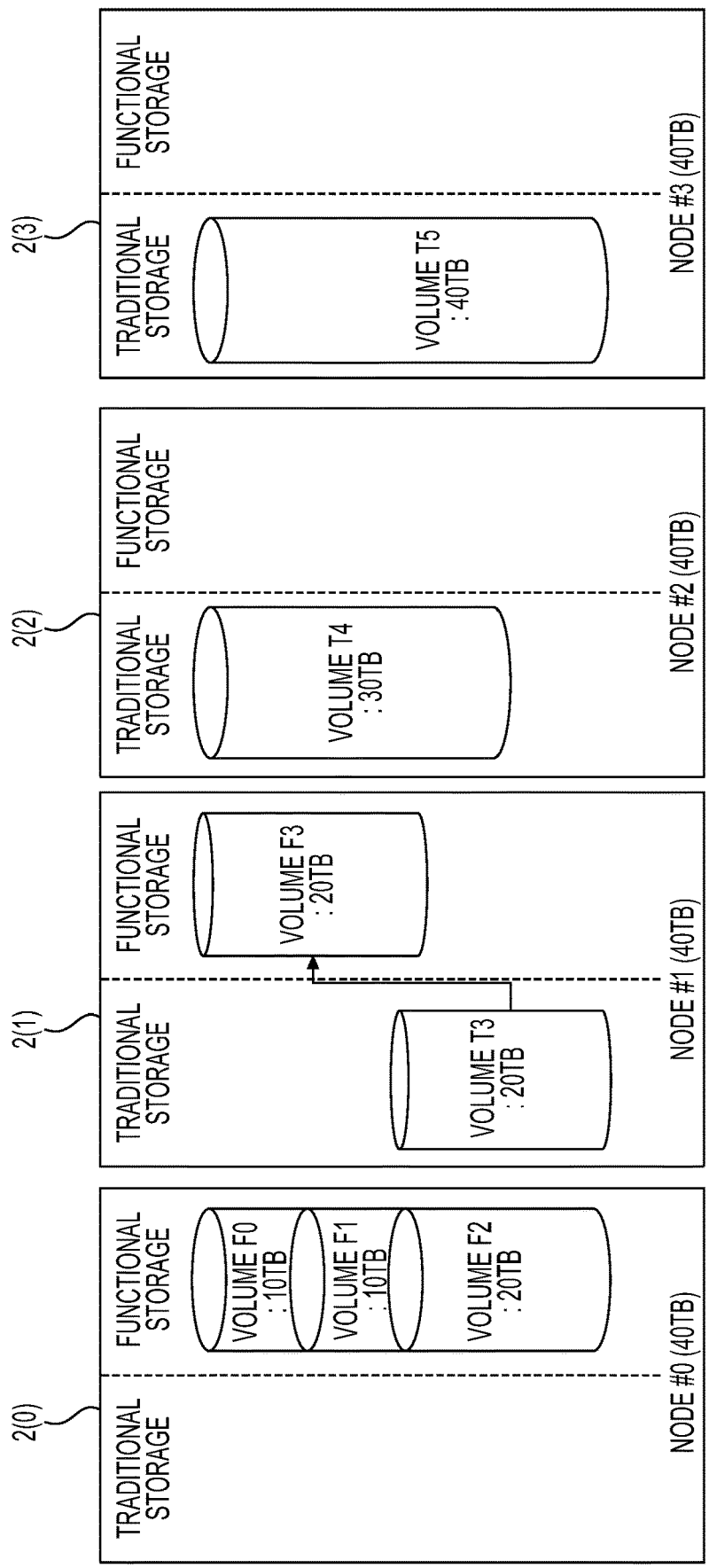
FIG. 21 illustrates a subsequent state to FIG. 20 according to some implementations.

In FIG. 21, the traditional volume T3 is migrated to a functional volume F3 on the same storage computing device 2(1). Such migration is similar to the migration of traditional volumes T0 and T1.

Figure 22:
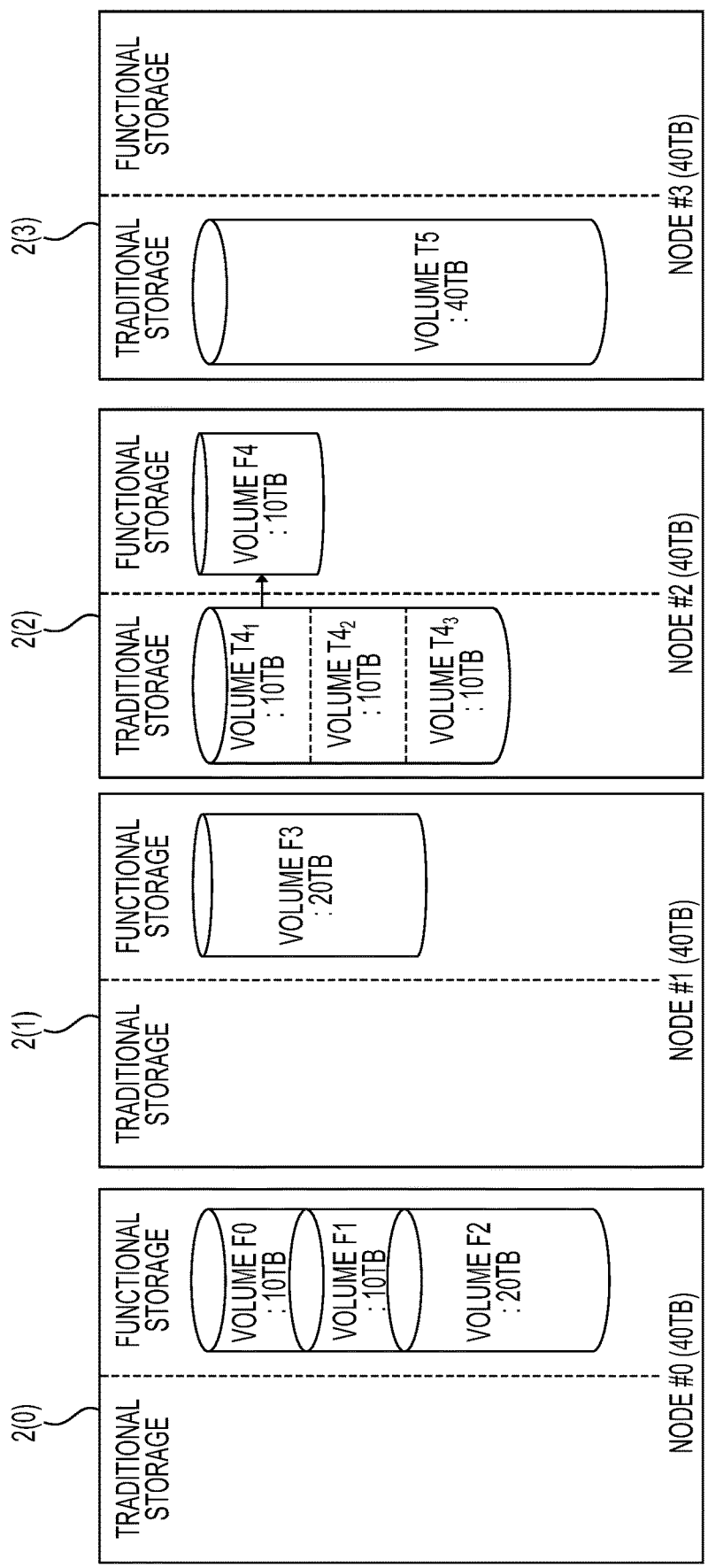
FIG. 22 illustrates a subsequent state to FIG. 20 according to some implementations.

In FIG. 22, following migration of the traditional volume T3 to the functional F3, the traditional volume T3 is deleted to free up storage capacity. Further in FIG. 22, the storage computing device 2(2) has 10 TB of free storage capacity available. In order to migrate the traditional volume T4, the available 10 TB of free storage capacity is used to migrate the traditional volume T4 to functional volumes on the same storage computing device 2(2) corresponding to the processing of 1316 and 1320. FIG. 21 shows that the traditional volume T4 is split into three units which are each 10 TB. As illustrated in FIG. 22, the first unit (e.g., volume $T4_1$) is migrated to the functional volume F4.

Figure 23:
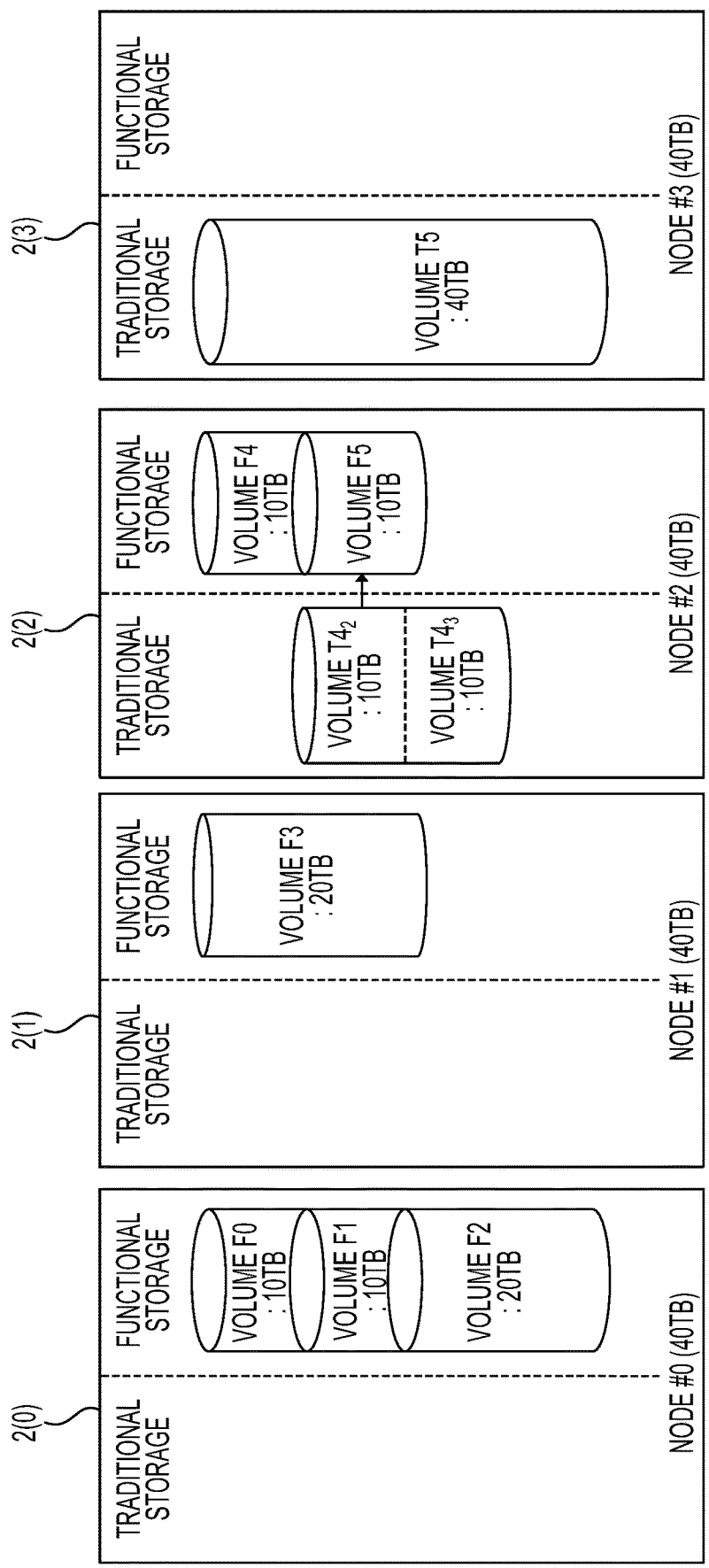
FIG. 23 illustrates a subsequent state to FIG. 22 according to some implementations.

In FIG. 23, after migration of the data of the first unit, the volume $T4_1$ may be deleted to free another 10 TB of available storage capacity. The second unit (e.g., volume $T4_2$) may then be migrated to the functional volume F5.

Figure 24:
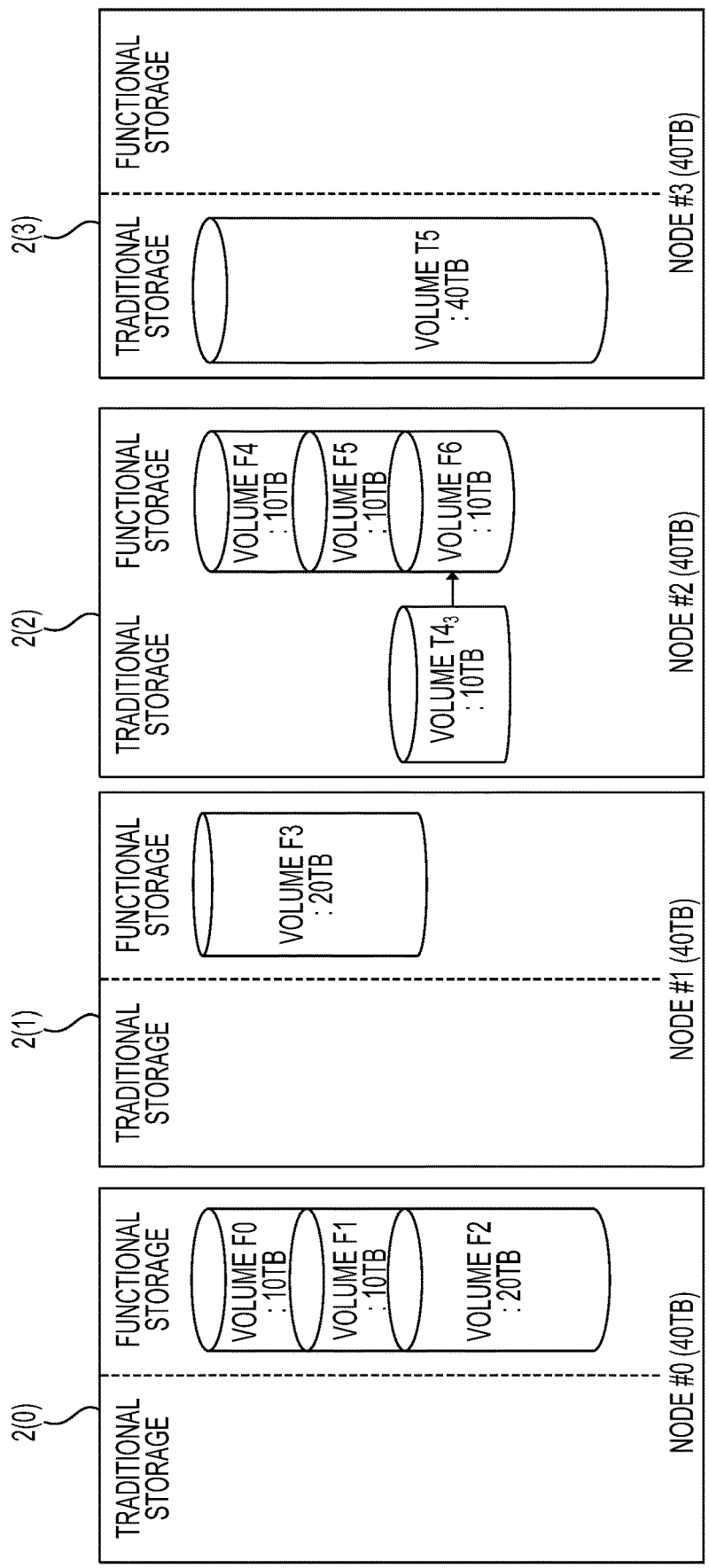
FIG. 24 illustrates a subsequent state to FIG. 23 according to some implementations.
Figure 25:
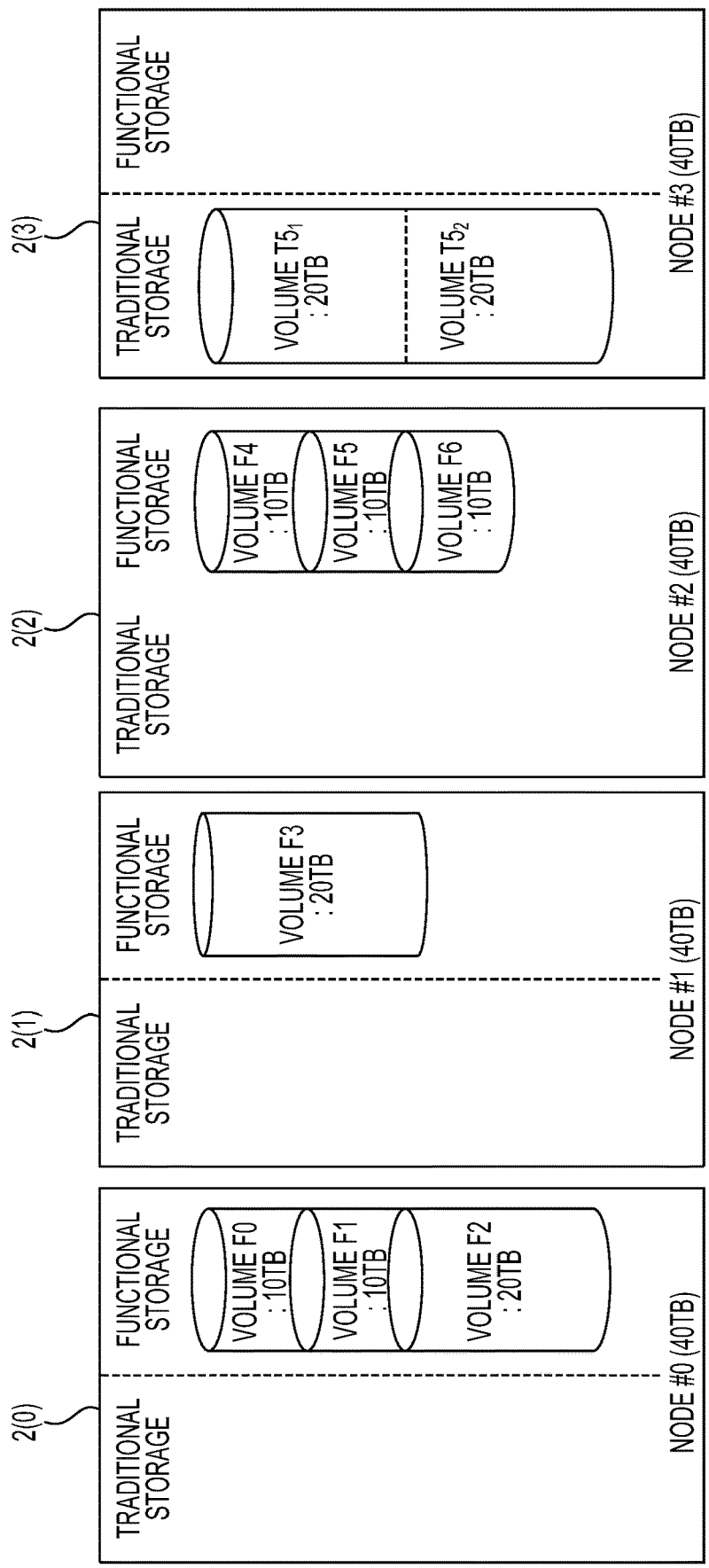
FIG. 25 illustrates a subsequent state to FIG. 24 according to some implementations.

In FIG. 24, after migration of the data of the second unit, the volume $T4_2$ may be deleted to free another 10 TB of available storage capacity. Similarly, the third unit (e.g., volume $T4_3$) may then be migrated to the functional volume F6. Thereafter, the volume $T4_3$ may be deleted as shown in FIG. 25. While FIGS. 20 to 25 show that the traditional volume T4 is split into three units which are each 10 TB, other implementations may split a given traditional volume into units of another size which is less than or equal to the free capacity 3033 of the given storage computing device 2.

In addition, in FIG. 25, the storage computing device 2(3) does not have any free storage capacity. Accordingly, the traditional volume T5 at the storage computing device 2(3) may be split into two units that are each 20 TB.

Figure 26:
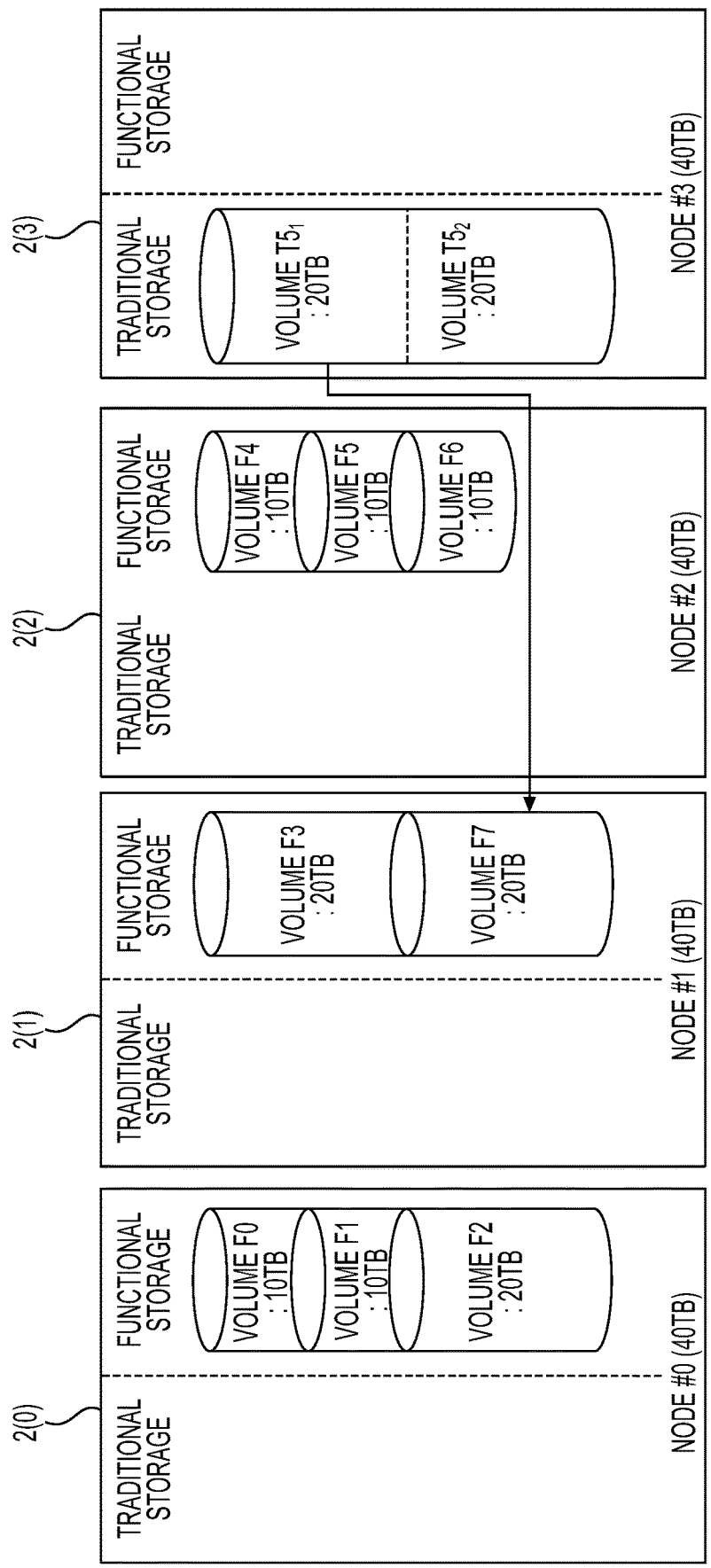
FIG. 26 illustrates a subsequent state to FIG. 25 according to some implementations.

In FIG. 26, the first unit (volume $T5_1$) is migrated to the functional volume F7 on the different storage computing device 2(1).

Figure 27:
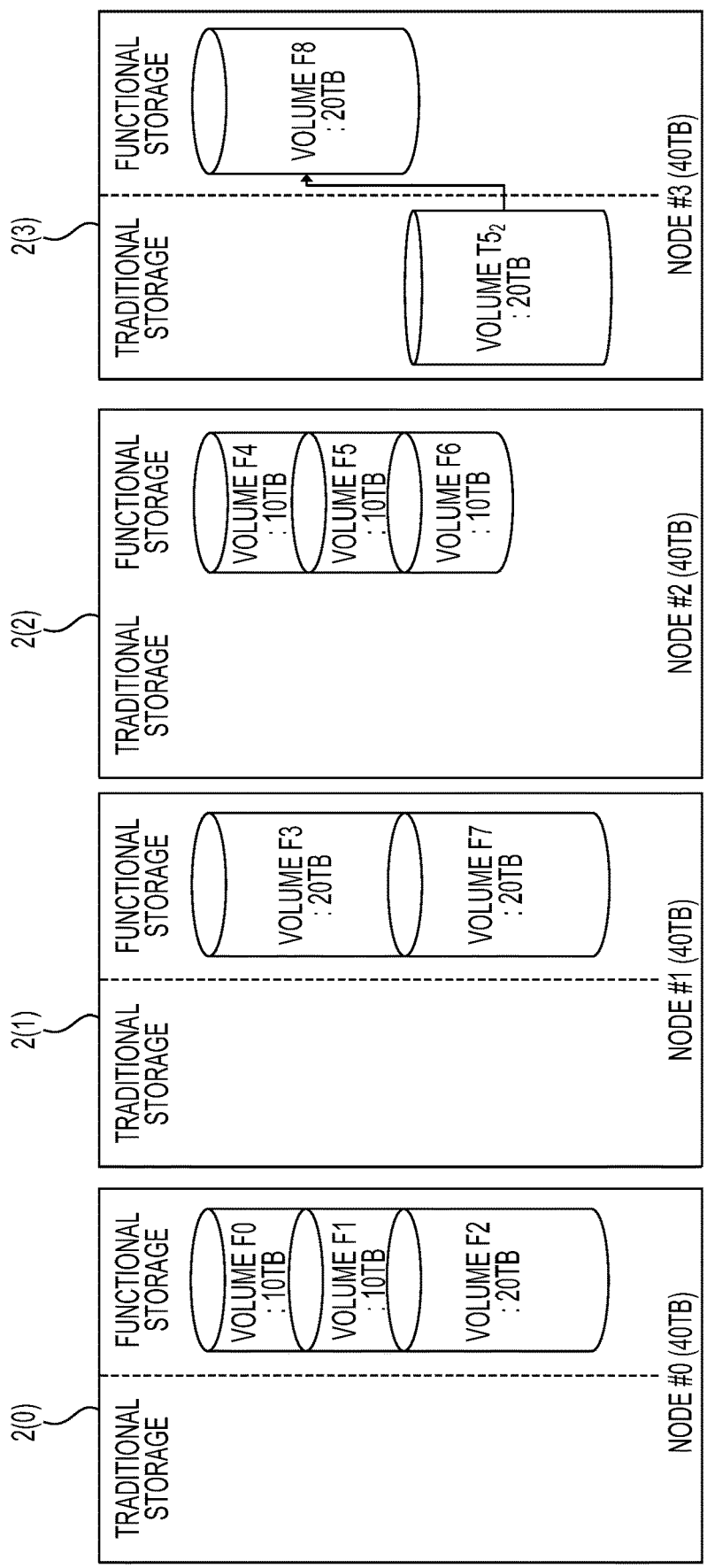
FIG. 27 illustrates a subsequent state to FIG. 26 according to some implementations.

In FIG. 27, after migration of the data of the first unit, the volume $T5_1$ may be deleted to free 20 TB of available storage capacity on the storage computing device 2(3). Then, the second unit (volume $T5_2$) may then be migrated to the functional volume F8 on the same storage computing device 2(3).

Figure 28:
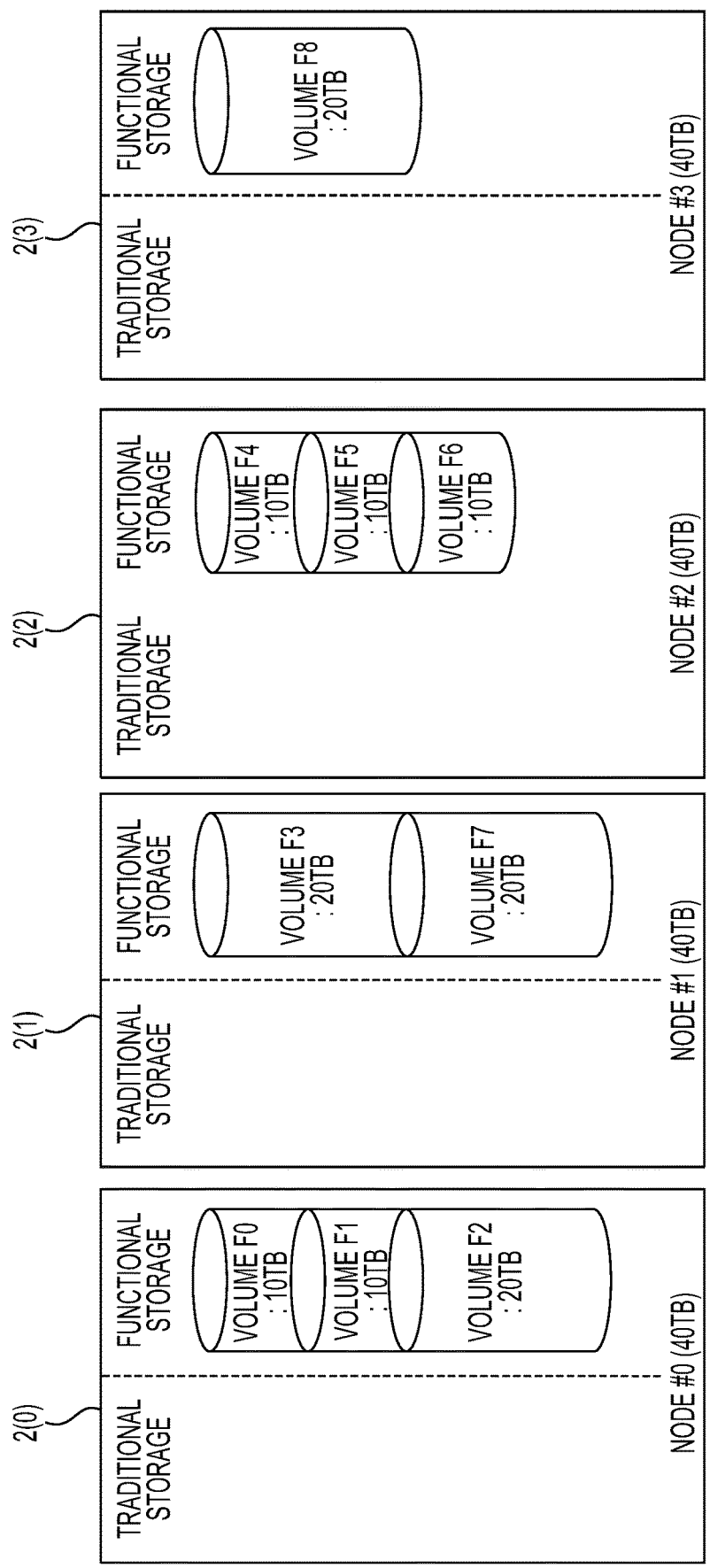
FIG. 28 illustrates a subsequent state to FIG. 27 according to some implementations.

In FIG. 28, after migration of the data of the second unit, the volume $T5_2$ may be deleted to free another 20 TB of available storage capacity on the storage computing device 2(3) as shown in FIG. 28. FIGS. 25 to 28 correspond to the processing of 1322-1330 in FIG. 13.

Accordingly, implementations herein may provide data storage operations for facilitating the migration and conversion of data in a traditional volume managed by traditional storage software in a first storage format to a virtual volume corresponding to one or more functional volumes managed by functional storage software in a second storage format while providing continuous access to the data during the migration process to the virtual volume managed by the functional storage software.

Various instructions, processes, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A computing device comprising:
one or more processors coupled for communication with one or more first storage devices, the one or more processors programmed by executable instructions to perform operations comprising:
storing a first volume of data in a first storage format on the one or more first storage devices;
determining a size of the first volume and determining a size of available space of the one or more first storage devices;
based on determining that the size of the first volume is less than the size of available space, configuring a second volume in a second storage format, different than the first storage format, on the one or more first storage devices, and migrating the data of the first volume to the second volume; and
based on determining that the size of the first volume is greater than the size of available space and that the size of available space is less than the threshold value:
determining a second storage computing device which does not have a size of available space greater than the size of the first volume and does have the size of available space greater than the first threshold,
splitting the first volume into a plurality of units,
configuring the second volume in the second storage format on the first storage devices,
causing the second storage computing device to configure a third volume in the second storage format, and
sequentially migrating the data in the units of the first volume to be split across the third volume and the second volume.

2. The computing device according to claim 1, wherein the one or more processors are further programmed by the executable instructions to perform operations comprising:
configuring a virtual external device on the first storage devices, the virtual external device corresponding to the first volume; and
when migrating the data of the first volume to the second volume, referring to the data of the first volume via the virtual external device.

3. The computing device according to claim 2, wherein the one or more processors are further programmed by the executable instructions to perform operations comprising:
deleting the virtual external device after migrating the data of the first volume to the second volume is complete.

4. The computing device according to claim 1, wherein the one or more processors are further programmed by the executable instructions to perform operations comprising, based on determining that the size of the first volume is greater than the size of available space and that the size of available space is greater than a threshold value,
splitting the first volume into a plurality of units,
configuring a plurality of fourth volumes in the second storage format on the first storage devices, and
sequentially migrating the data in the units of the first volume to the plurality of fourth volumes.

5. The computing device according to claim 4, wherein the one or more processors are further programmed by the executable instructions to perform operations comprising:
configuring a virtual external device on the first storage devices, the virtual external device corresponding to the first volume; and
when sequentially migrating the data in the units of the first volume to the fourth volumes, referring to the data of the first volume via the virtual external device.

6. The computing device according to claim 5, wherein the one or more processors are further programmed by the executable instructions to perform operations comprising deleting the virtual external device after migrating the data of the first volume to the fourth volumes is complete.

7. The computing device according to claim 1, wherein the one or more processors are further programmed by the executable instructions to perform operations comprising:
based on determining that the size of the first volume is greater than the size of available space and that the size of available space is less than the threshold value, determining a second storage computing device which has a size of available space greater than the size of the first volume, and
causing the second storage computing device to configure a fourth volume in the second storage format thereon and to migrate the data of the first volume to the fourth volume.

8. The computing device according to claim 1, the one or more processors are further programmed by the executable instructions to perform operations comprising:
configuring a virtual external device on the first storage devices, the virtual external device corresponding to the first volume; and
when migrating the data of the first volume to the third volume and the second volume, referring to the data of the first volume via the virtual external device.

9. The computing device according to claim 1, the one or more processors are further programmed by the executable instructions to perform operations comprising deleting the virtual external device after migrating the data of the first volume to the third volume and the second volume is complete.

10. A system comprising:
a first storage computing device able to communicate with an application computing device, wherein the application computing device is configured to manage a file system of data accessed by an application,
the first storage computing device including one or more processors coupled for communication with first storage devices, the one or more processors programmed by executable instructions to perform operations comprising:
storing a first volume of the data in a first storage format on the first storage devices;
determining a size of the first volume and determining a size of available space of the first storage devices;
based on determining that the size of the first volume is less than the size of available space, configuring a second volume in a second storage format, different than the first storage format, on the first storage devices, and migrating the data of the first volume to the second volume; and
based on determining that the size of the first volume is greater than the size of available space and that the size of available space is greater than a threshold value:
splitting the first volume into a plurality of units,
configuring a plurality of third volumes in the second storage format on the first storage devices, and
sequentially migrating the data in the units of the first volume to the plurality of third volumes.

11. The system according to claim 10, wherein the one or more first processors are further programmed by the executable instructions to perform operations comprising:
configuring a virtual external device on the first storage devices, the virtual external device corresponding to the first volume; and
when migrating the data of the first volume to the second volume, referring to the data of the first volume via the virtual external device.

12. The system according to claim 11, wherein the one or more first processors are further programmed by the executable instructions to perform operations comprising:
deleting the virtual external device after migrating the data of the first volume to the second volume is complete.

13. The storage system according to claim 10, wherein the one or more first processors are further programmed by the executable instructions to perform operations comprising:
configuring a virtual external device on the first storage devices, the virtual external device corresponding to the first volume;
when migrating the data of the first volume to the third volumes, referring to the data of the first volume via the virtual external device; and
deleting the virtual external device after migrating the data of the first volume to the third volumes is complete.

14. A method comprising:
storing, by one or more processors, a first volume of data in a first storage format on one or more first storage devices;
determining, by the one or more processors, a size of the first volume;
determining, by the one or more processors, a size of available space of the one or more first storage devices;
based on determining that the size of the first volume is less than the size of available space: configuring, by the one or more processors, a second volume in a second storage format, different than the first storage format, on the one or more first storage devices, and migrating the data of the first volume to the second volume; and
based on determining that the size of the first volume is greater than the size of available space and that the size of available space is greater than a threshold value:
splitting the first volume into a plurality of units,
configuring a plurality of third volumes in the second storage format on the one or more first storage devices, and
sequentially migrating the data in the units of the first volume to the plurality of third volumes.

15. The method according to claim 14, further comprising:
configuring a virtual external device on the one or more first storage devices, the virtual external device corresponding to the first volume; and
when migrating the data of the first volume to the second volume, referring to the data of the first volume via the virtual external device.

16. The method according to claim 15, further comprising deleting the virtual external device after migrating the data of the first volume to the second volume is complete.

17. The method according to claim 14, further comprising:

configuring a virtual external device on the one or more first storage devices, the virtual external device corresponding to the first volume; and when sequentially migrating the data in the units of the first volume to the third volumes, referring to the data of the first volume via the virtual external device.

* * * * *